US011617155B2

(12) United States Patent
Lin et al.

(10) Patent No.: US 11,617,155 B2
(45) Date of Patent: Mar. 28, 2023

(54) METHOD AND APPARATUS FOR UE POWER SAVING IN RRC_IDLE/INACTIVE STATE

(71) Applicant: Samsung Electronics Co., Ltd., Suwon-si (KR)

(72) Inventors: Qiongjie Lin, Sunnyvale, CA (US); Aris Papasakellariou, Houston, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/948,910

(22) Filed: Oct. 5, 2020

(65) Prior Publication Data
US 2021/0105739 A1 Apr. 8, 2021

Related U.S. Application Data

(60) Provisional application No. 62/912,379, filed on Oct. 8, 2019, provisional application No. 62/980,617, filed on Feb. 24, 2020.

(51) Int. Cl.
H04W 68/00 (2009.01)
H04W 72/04 (2023.01)
(Continued)

(52) U.S. Cl.
CPC ......... H04W 68/005 (2013.01); H04L 1/0061 (2013.01); H04L 5/0048 (2013.01);
(Continued)

(58) Field of Classification Search
CPC ... H04L 1/0041; H04L 5/0094; H04L 5/0048; H04L 5/0098; H04L 5/005; H04L 5/0053;
(Continued)

(56) References Cited

U.S. PATENT DOCUMENTS 9,306,725 B2 * 4/2016 Papasakellariou .... H04L 5/0048
10,231,208 B2 * 3/2019 Agiwal ................. H04W 68/02
(Continued)

FOREIGN PATENT DOCUMENTS

WO   2019029711 A1   2/2019

OTHER PUBLICATIONS

3rd Generation Partnership Project, "Study on New Radio (NR) access technology", (Release 15) Technical Specification Group Radio Access Network, 3GPP TR 38.912 V15.0 0, Technical Specification, Jun. 2018, 74 pages.
(Continued)

Primary Examiner — Man U Phan

(57) ABSTRACT

Methods and apparatuses for power saving operations. A method of a UE includes receiving a configuration for a number of RS resource sets, a configuration for a PO over slots in time, an indication for activation or deactivation of one or more RS resources from the number of RS resource sets, and the one or more RS resources from the number of RS resource sets when the indication is for activation. The RS resource sets include a number of RS resources. The number of RS resource sets are associated with respective spatial parameters. The PO includes a number of PDCCH reception occasions. The number of PDCCH reception occasions are associated with respective spatial parameters for PDCCH receptions. The method further includes determining a PDCCH reception occasion from the number of PDCCH reception occasions. The PDCCH reception occasion has a same spatial parameter as a RS resource set from the number of RS resource sets.

12 Claims, 15 Drawing Sheets

(51) Int. Cl.
| | |
|---|---|
| *H04L 5/00* | (2006.01) |
| *H04W 72/044* | (2023.01) |
| *H04W 72/0453* | (2023.01) |
| *H04L 1/00* | (2006.01) |
| *H04W 76/11* | (2018.01) |
| *H04W 72/0446* | (2023.01) |

(52) U.S. Cl.
CPC ......... *H04L 5/0098* (2013.01); *H04W 72/042* (2013.01); *H04W 72/046* (2013.01); *H04W 72/0446* (2013.01); *H04W 72/0453* (2013.01); *H04W 72/0466* (2013.01); *H04W 76/11* (2018.02)

(58) Field of Classification Search
CPC ........... H04L 1/0061; H04L 5/00; H04L 1/00; H04W 76/11; H04W 68/005; H04W 72/0453; H04W 72/0466; H04W 72/0446; H04W 72/046; H04W 68/02; H04W 72/042; H04W 68/00; H04W 72/04; Y02D 30/70
USPC .......................................................... 370/329
See application file for complete search history.

(56) References Cited

U.S. PATENT DOCUMENTS

| | | | | |
|---|---|---|---|---|
| 10,524,228 | B2* | 12/2019 | Agiwal | H04W 68/025 |
| 10,560,901 | B2* | 2/2020 | Jung | H04W 72/1289 |
| 10,602,479 | B1* | 3/2020 | Agiwal | H04W 68/02 |
| 10,609,676 | B1* | 3/2020 | Agiwal | H04W 68/005 |
| 10,652,826 | B2* | 5/2020 | Lin | H04W 52/0229 |
| 10,701,580 | B2* | 6/2020 | Kim | H04W 72/046 |
| 10,708,028 | B2* | 7/2020 | Nam | H04W 72/0446 |
| 10,764,862 | B2* | 9/2020 | Agiwal | H04W 68/005 |
| 10,820,299 | B2* | 10/2020 | Liu | H04W 68/025 |
| 10,834,699 | B2* | 11/2020 | Liu | H04W 52/028 |
| 10,904,861 | B2* | 1/2021 | Hwang | H04W 68/02 |
| 10,986,564 | B2* | 4/2021 | Lee | H04W 68/005 |
| 10,993,189 | B2* | 4/2021 | Jung | H04W 52/50 |
| 11,051,250 | B2* | 6/2021 | Hwang | H04W 52/0229 |
| 11,071,000 | B2* | 7/2021 | Si | H04L 5/10 |
| 11,116,032 | B2* | 9/2021 | Zhou | H04W 52/0206 |
| 11,166,234 | B2* | 11/2021 | Zhou | H04W 52/0206 |
| 11,178,608 | B2* | 11/2021 | Ingale | H04W 72/042 |
| 11,178,666 | B2* | 11/2021 | Harada | H04L 5/0048 |
| 11,212,747 | B2* | 12/2021 | Zhou | H04W 52/143 |
| 11,224,029 | B2* | 1/2022 | Rune | H04W 8/24 |
| 11,296,762 | B2* | 4/2022 | Sartori | H04B 7/0617 |
| 2019/0159165 | A1 | 5/2019 | Agiwal et al. | |
| 2019/0254110 | A1 | 8/2019 | He et al. | |
| 2020/0275372 | A1* | 8/2020 | Lin | H04W 52/0219 |
| 2021/0153162 | A1* | 5/2021 | Chen | H04W 56/001 |
| 2021/0159961 | A1* | 5/2021 | Xu | H04W 72/0453 |
| 2021/0243741 | A1* | 8/2021 | Lin | H04W 76/28 |
| 2021/0243805 | A1* | 8/2021 | Si | H04W 16/28 |
| 2021/0288773 | A1* | 9/2021 | Lin | H04W 56/001 |
| 2021/0297987 | A1* | 9/2021 | Hwang | H04L 5/0048 |
| 2021/0360586 | A1* | 11/2021 | Nam | H04W 76/27 |
| 2021/0360680 | A1* | 11/2021 | Nam | H04W 72/0446 |
| 2022/0022215 | A1* | 1/2022 | Gao | H04W 72/1263 |
| 2022/0039085 | A1* | 2/2022 | Harada | H04W 48/10 |
| 2022/0132414 | A1* | 4/2022 | Ingale | H04W 72/042 |

OTHER PUBLICATIONS

Huawei, et al., "PDCCH-based power saving signal/channel", R1-1910076, 3GPP TSG RAN WG1 Meeting #98bis, Chongqing, China, Oct. 14-20, 2019, 21 pages.
Huawei, et al., "UL transmission in preconfigured resource", R1-1910081, 3GPP TSG RAN WG1 Meeting #98bis, Chongqing, China, Oct. 14-20, 2019, 9 pages.
International Search Report and Written Opinion of the International Searching Authority in connection with International Application No. PCT/KR2020/013693 dated Jan. 20, 2021, 7 pages.
Samsung, "Enhancements on configured grant for NR-U", R1-1908468, 3GPP TSG RAN WG1 #98, Prague, CA, Aug. 26-30, 2019, 5 pages.
"5G; NR; Physical channels and modulation (3GPP TS 38.211 version 15.5.0 Release 15)", ETSI TS 138 211 V15.5.0, Apr. 2019, 98 Pages.
"5G; NR; Multiplexing and channel coding (3GPP TS 38.212 version 15.5.0 Release 15)", ETSI TS 138 212 V15.5.0, May 2019, 104 pages.
"5G; NR; Physical layer procedures for control (3GPP TS 38.213 version 15.5.0 Release 15)", ETSI TS 138 213 v15.5.0, May 2019, 106 pages.
"5G; NR; Physical layer procedures for data (3GPP TS 38.214 version 15.5.0 Release 15)", ETSI TS 138 214 V15.5.0, May 2019, 105 pages.
"3rd Generation Partnership Project; Technical Specification Group Radio Access Network; NR; Physical layer measurements, (Release 15)", 3GPP TS 38 215 V15 5.0, Jun. 2019, 16 pages.
"5G; NR; Medium Access Control (MAC) protocol specification (3GPP TS 38.321 version 15.5.0 Release 15)", ETSI TS 138 321 V15 5.0, May 2019, 80 pages.
"3rd Generation Partnership Project; Technical Specification Group Radio Access Network; NR; Radio Resource Control (RRC) protocol specification, (Release 15)", 3GPP TS 38 331 V15.5.0, Mar. 2019, 491 pages.
"5G; Nr; User Equipment (UE) procedures in idle mode and in RRC Inactive state (3GPP TS 38.304 version 15.5.0 Release 15)", ETSI TS 138 304 V15.5.0, Oct. 2019, 31 pages.
"3rd Generation Partnership Project; Technical Specification Group Radio Access Network; NR; Requirements for support of radio resource management, (Release 16)", 3GPP TS 38.133 V16.0.0, Jun. 2019, 999 pages.
Extended European Search Report dated Oct. 12, 2022 regarding Application 20874006.8, 7 pages.

\* cited by examiner

METHOD AND APPARATUS FOR UE POWER SAVING IN RRC_IDLE/INACTIVE STATE

CROSS-REFERENCE TO RELATED APPLICATIONS AND CLAIM OF PRIORITY

The present application claims priority to U.S. Provisional Patent Application No. 62/912,379, filed on Oct. 8, 2019, and U.S. Provisional Patent Application No. 62/980,617, filed on Feb. 24, 2020. The content of the above-identified patent document is incorporated herein by reference.

TECHNICAL FIELD

The present disclosure relates generally to wireless communication systems and, more specifically, the present disclosure relates to a power saving operation in an RRC_IDLE/INACTIVE STATE.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates a power saving operation in an RRC_IDLE/INACTIVE STATE.

In one embodiment, a user equipment (UE) is provided. The UE includes a transceiver configured to receive a configuration for a number of reference signal (RS) resource sets, a configuration for a paging occasion (PO) over slots in time, an indication for activation or deactivation of one or more RS resources from the number of RS resource sets, and the one or more RS resources from the number of RS resource sets when the indication is for activation of the one or more RS resources. The number of RS resource sets include a number of RS resources. The number of RS resource sets are associated with respective spatial parameters. The PO includes a number of physical downlink control channel (PDCCH) reception occasions. The number of PDCCH reception occasions are associated with respective spatial parameters for PDCCH receptions. The UE also includes a processor operably connected to the transceiver. The processor is configured to determine a PDCCH reception occasion from the number of PDCCH reception occasions. The PDCCH reception occasion has a same spatial reception parameter as a RS resource set from the number of RS resource sets.

In another embodiment, a base station (BS) is provided. The BS includes a transceiver configured to transmit a configuration for a number of RS resource sets, a configuration for a PO over slots in time, an indication for activation or deactivation of one or more RS resources from the number of RS resource sets, and the one or more RS resources from the number of RS resource sets when the indication is for activation of the one or more RS resources. The number of RS resource sets include a number of RS resources. The number of RS resource sets associated with respective spatial parameters. The PO includes a number of PDCCH transmission occasions. The number of PDCCH transmission occasions are associated with respective spatial parameters for PDCCH transmissions. The BS also includes a processor operably connected to the transceiver. The processor is configured to determine a PDCCH transmission occasion from the number of PDCCH transmission occasions. The PDCCH reception occasion has a same spatial parameter as a RS resource set from the number of RS resource sets.

In yet another embodiment, a method of a UE is provided. The method includes receiving a configuration for a number of RS resource sets, a configuration for a PO over slots in time, an indication for activation or deactivation of one or more RS resources from the number of RS resource sets, and the one or more RS resources from the number of RS resource sets when the indication is for activation of the one or more RS resources. The number of RS resource sets include a number of RS resources. The number of RS resource sets are associated with respective spatial parameters. The PO includes a number of PDCCH reception occasions. The number of PDCCH reception occasions are associated with respective spatial parameters for PDCCH receptions. The method further includes determining a PDCCH reception occasion from the number of PDCCH reception occasions. The PDCCH reception occasion has a same spatial parameter as a RS resource set from the number of RS resource sets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.5.0, "NR; Physical channels and modulation;" 3GPP TS 38.212 v15.5.0, "NR; Multiplexing and Channel coding;" 3GPP TS 38.213 v15.5.0, "NR; Physical Layer Procedures for Control;" 3GPP TS 38.214 v15.5.0, "NR; Physical Layer Procedures for Data;" 3GPP TS 38.321 v15.5.0, "NR; Medium Access Control (MAC) protocol specification;" 3GPP TS 38.331 v15.5.0, "NR; Radio Resource Control (RRC) Protocol Specification;" 3GPP TS 38.304 v15.5.0, "NR; User Equipment (UE) procedures in Idle mode and RRC Inactive State;" and 3GPP TS 38.133 v16.0.0, "NR; Requirements for support of radio resource management."

Figure 1:
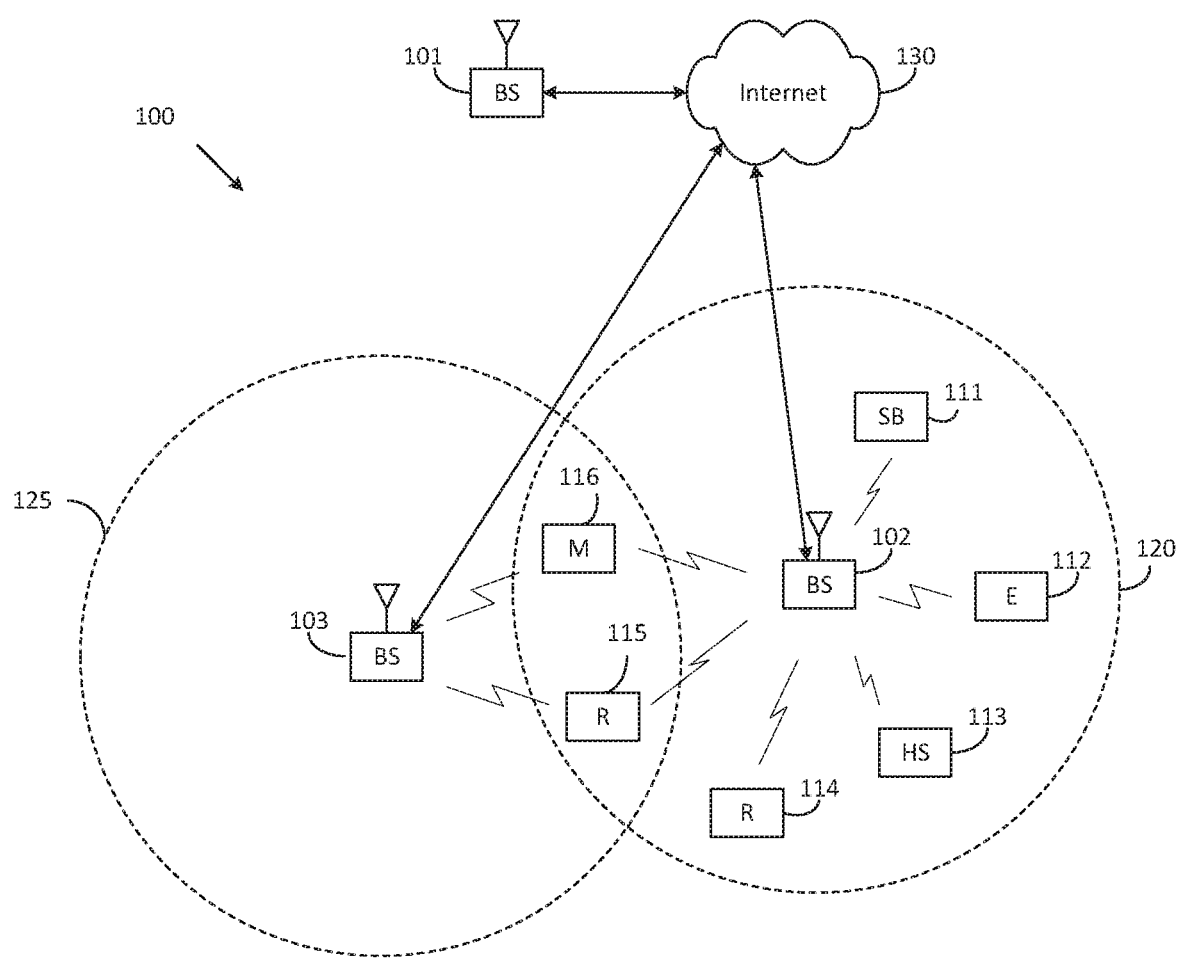
FIG. 1 illustrates an example wireless network according to embodiments of the present disclosure.
Figure 2:
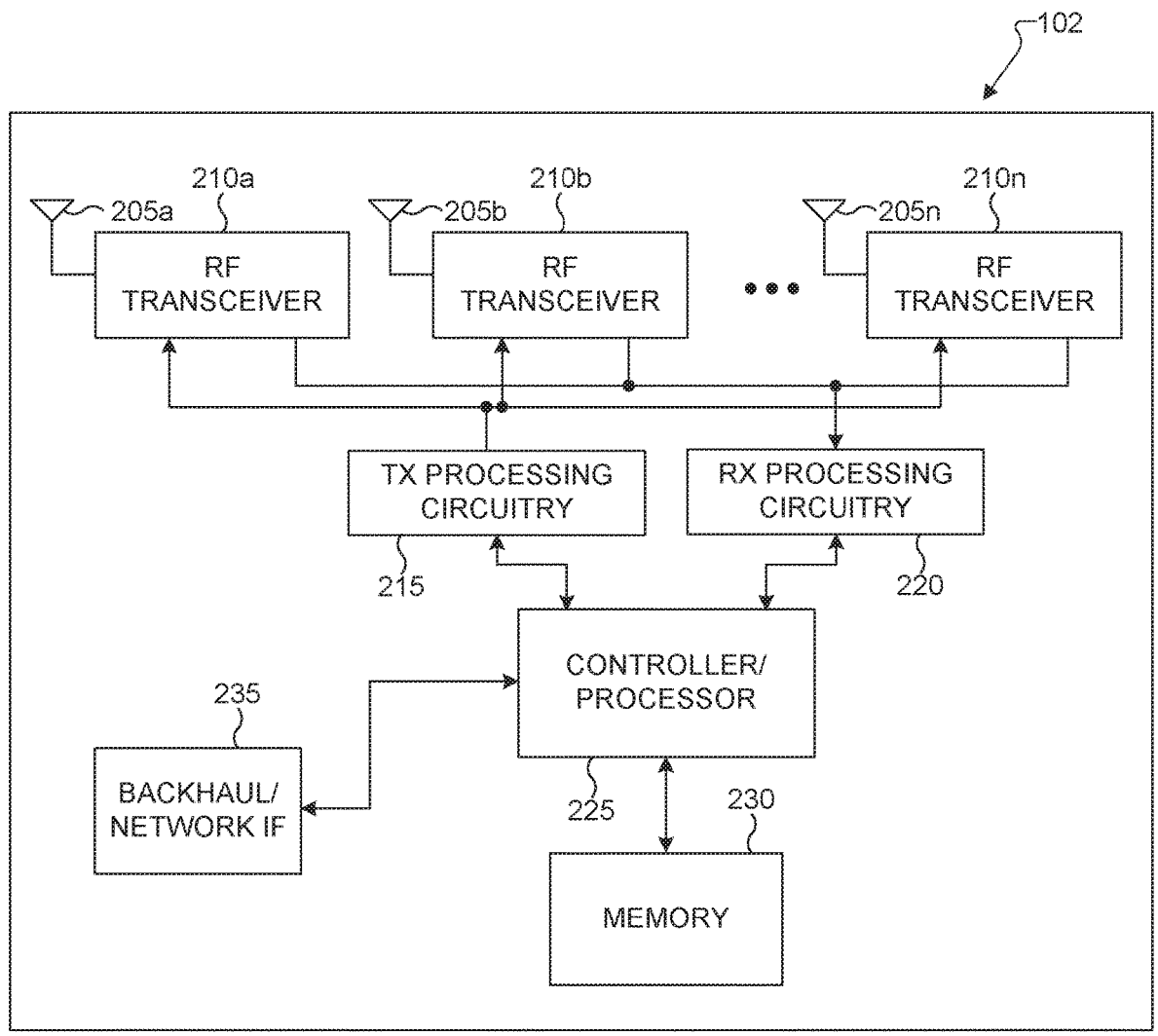
FIG. 2 illustrates an example gNB according to embodiments of the present disclosure.
Figure 3:
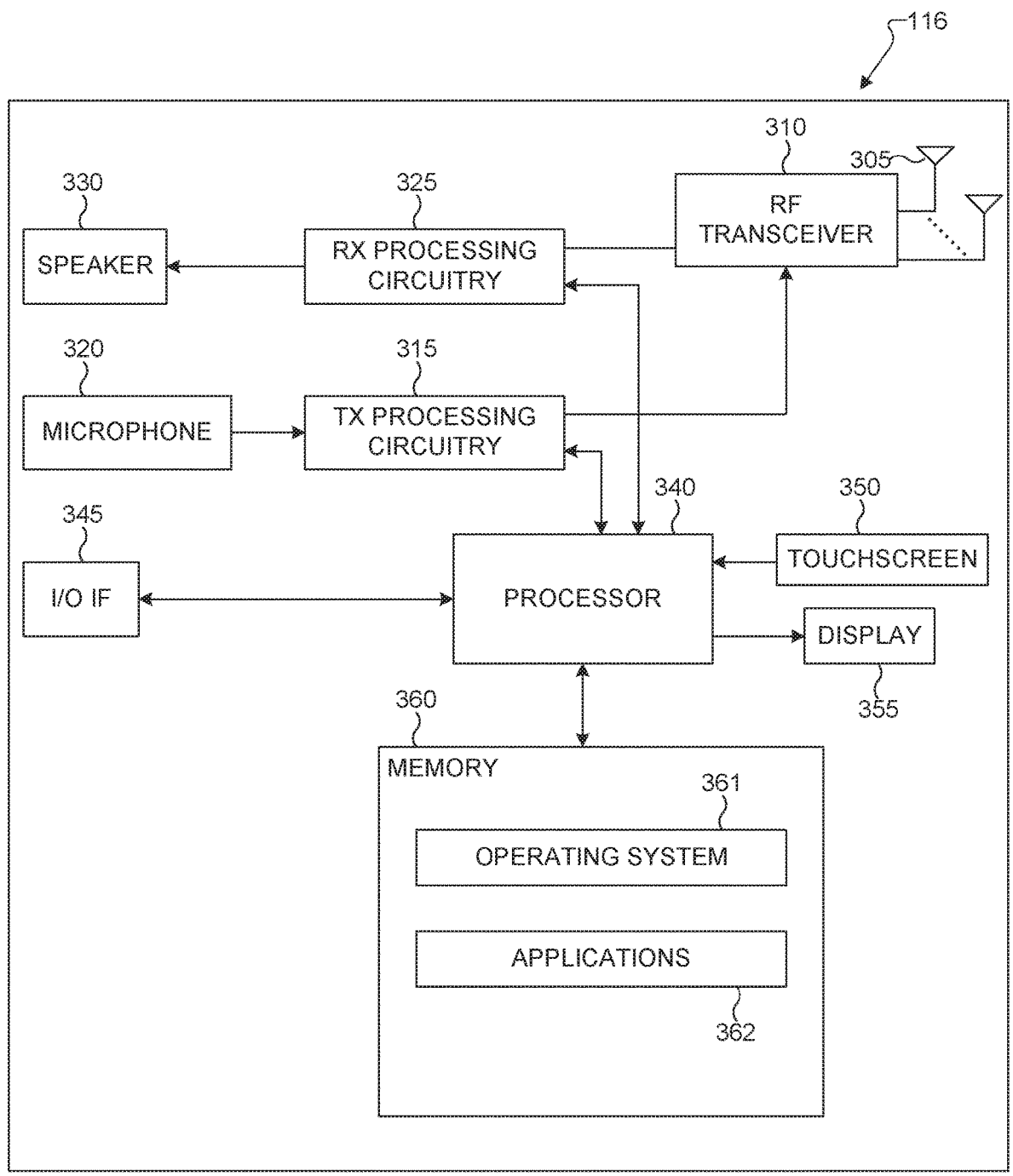
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient UE power saving in RRC_IDLE/INACTIVE state. In certain embodiments, and one or more of the gNBs 101-103 includes circuitry, programing, or a combination thereof, for efficient UE power saving in RRC_IDLE/INACTIVE state.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems, efforts have been made to develop an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 60 GHz bands, so as to accomplish higher data rates or in lower frequency bands, such as 6 GHz and lower bands, to enable robust coverage. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols.

A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
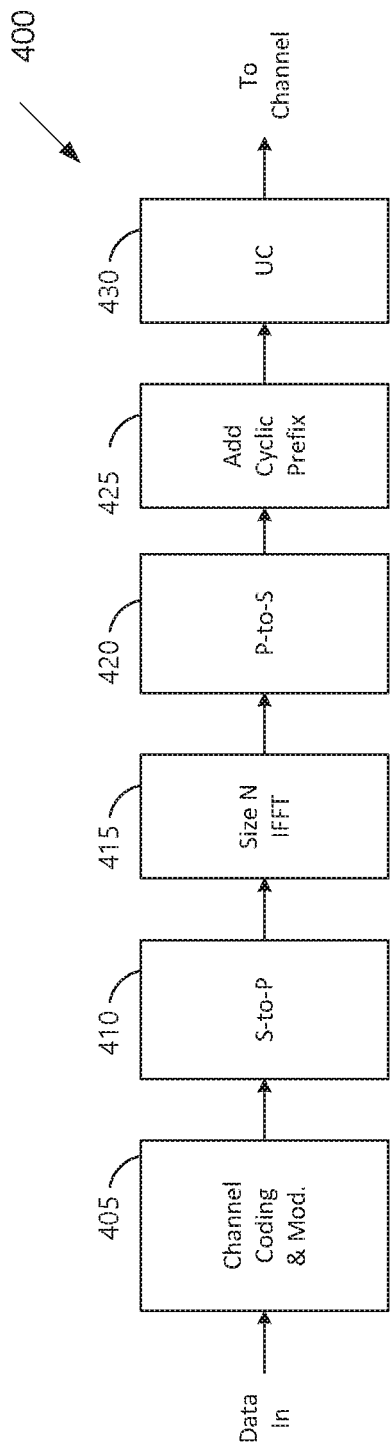
FIGS. 4 and 5 illustrate example wireless transmit and receive paths according to this disclosure.
Figure 5:
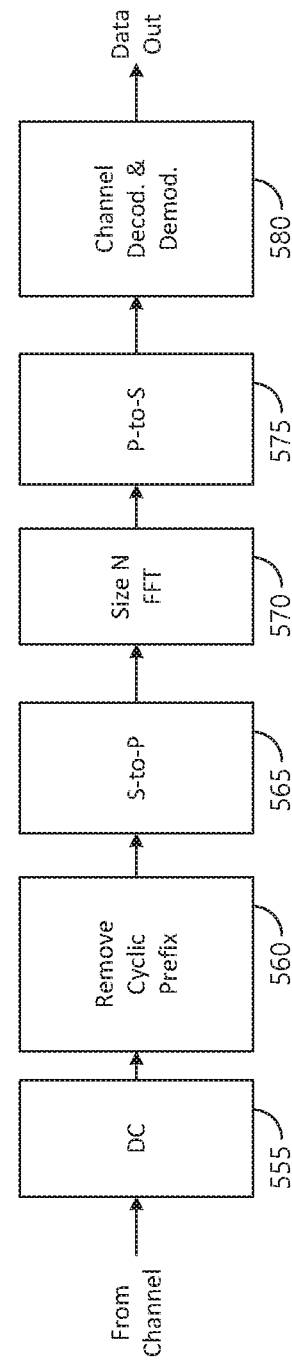

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For a UE operates in RRC_IDLE/INACTIVE state, the UE can be configured to monitoring Type2-PDCCH for paging message per discontinuous reception (DRX) cycle. The paging messages are sent by a mobility management entity (MME) to all gNodeBs in a tracking area and those gNodeBs in a tracking area are transmitting the same paging message.

For 5G NR, a paging occasion (PO) is a set of PDCCH monitoring occasions and can include multiple time slots (e.g., subframe or OFDM symbol) where paging DCI can be sent. The PDCCH monitoring occasions (MOs) of paging are determined according to pagingSearchSpace as specified in NR standard specification.

Except for paging monitoring, a UE in RRC_IDLE/INACTIVE state may perform radio resource measurement (RRM) measurement for cell reselection. In 5G NR, synchronization signal/physical broadcasting channel (SS/PBCH) block (SSB) is used for RRM measurement, and both secondary synchronization signal (SSS) and DMRS of NR-PBCH can be used as the reference signal (RS) for IDLE/INACTIVE mode RRM measurement.

Figure 6A:
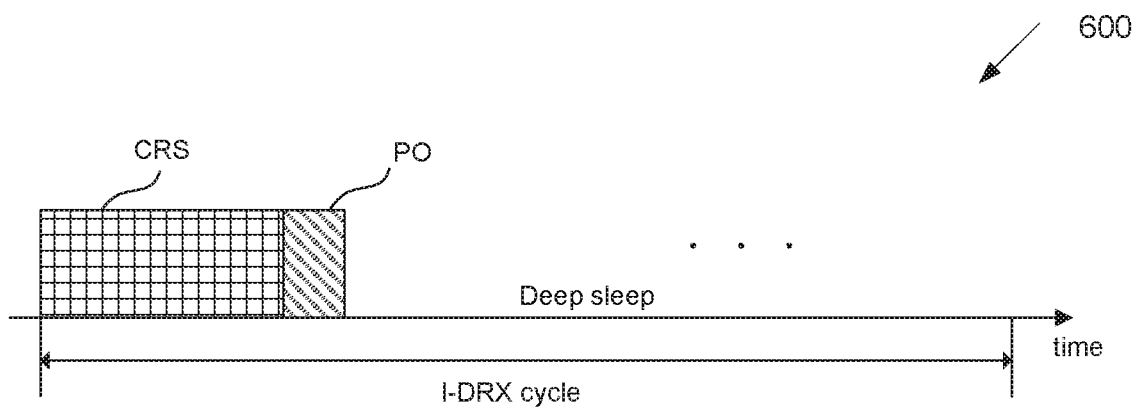
FIG. 6A illustrates an example DL signal monitoring or reception for a UE in RRC_IDLE/INACTIVE state according to embodiments of the present disclosure.
Figure 6B:
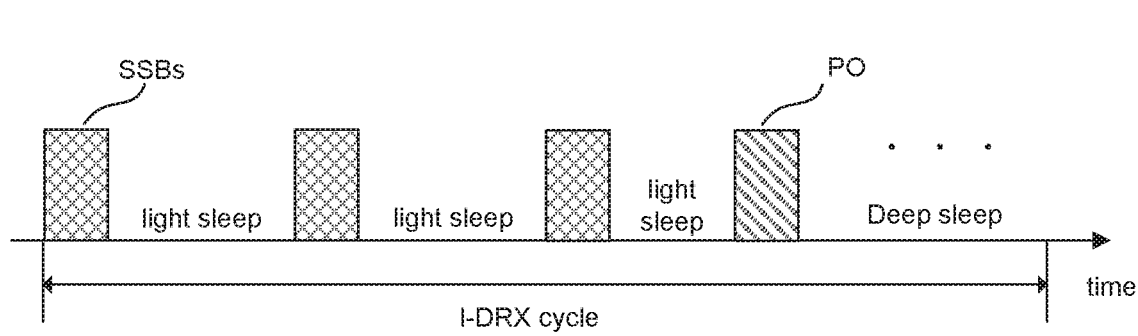
FIG. 6B illustrates another example DL signal monitoring or reception for a UE in RRC_IDLE/INACTIVE state according to embodiments of the present disclosure.

FIG. 6A illustrates an example DL signal monitoring or reception 600 for a UE in RRC_IDLE/INACTIVE state according to embodiments of the present disclosure. An embodiment of the DL signal monitoring or reception 600 shown in FIG. 6A is for illustration only. FIG. 6B illustrates another example DL signal monitoring or reception 650 for a UE in RRC_IDLE/INACTIVE state according to embodiments of the present disclosure. An embodiment of the DL signal monitoring or reception 650 shown in FIG. 6B is for illustration only.

As illustrated in FIGS. 6A and 6B, UE power consumption for operating in RRC_IDLE/INACTIVE state can be increased a lot for 5G NR compared with LTE. FIG. 6A illustrates the DL signal monitoring or reception in LTE and FIG. 6B illustrates the DL signal monitoring or reception in NT.

One issue related to higher UE power consumption in idle/inactive state for 5G NR is a longer wake up time for RRM measurement and paging monitoring. According to NR standard specification, a UE may measure the synchronization signal-reference signal received power (SS-RSRP) and SS-reference signal received quality (SS-RSRQ) level of serving cell and evaluate the cell selection criterion S for the serving cell at least once every M1*N1 DRX cycle, which is known as RRM measurement period. M1=2 if SS/PBCH block measurement timing configuration (SMTC) periodicity (TSMTC)>20 ms and DRX cycle≤0.64 second, otherwise M1=1. To achieve the measurement accuracy requirement, a UE may need to perform multiple L1 measurement samples for noise smoothing within an RRM measurement period. Due to the distributive SSB burst sets in physical layer as illustrated in FIG. 6B, a UE may need to wake up multiple times to process multiple L1 RSRP or RSRQ measurement samples.

In addition to RSRP or RSRQ measurement, a UE also rely on SSB for running all necessary loops (e.g., automatic gain control (AGC), time tracking loop (TTL), and frequency tracking loop (FTL)) after waking up from a sleep mode. A UE has to at least keep light sleep during the time gap between SSBs for loop convergence or RRM measurement and the time gap between the closest SSB to an associated PO.

To reduce the wake-up time of UE without impact the UE's mobility performance, additional reference signal (RS) can be introduced for RRM measurement. To reduce the signaling overhead in the network, aperiodic RS or semi-persistent RS can be utilized in various embodiments. For example, a paging DCI format can be used to trigger or (de)activate additional RS transmitted over time domain resources associated with a PO.

Another issue is unnecessary wakeups for data reception during PO. In many cases, a UE would waste energy on waking up for paging monitoring. In one case, a UE may wake up in associated PO but there is no Type0-PDCCH transmitted by a gNB in the PO. In another example, in the associated PO, a UE can be indicated to decode PDSCH for paging message with false alarm, such that the UE identification (UE ID) is not included in the paging message.

To avoid the unnecessary wake-ups in idle/inactive mode, a wake up signal (WUS) is transmitted before a PO to indicate the existence of paging message for LTE machine-type-communication (MTC) and NR Internet-on-everything (NR-IoT). A UE monitors WUS in preconfigured time and frequency resources, and the UE skips PO monitoring if the UE does not detect the WUS. Similar scheme can be considered for 5G NR. However, unlike LTE MTC/NB-IoT, the PO includes multiple PDCCH monitoring occasions in preconfigured search space set. The search space set for paging is configured by higher laying signaling, i.e., searchSpacePaging in NR standard specification. The searchSpacePaging can either be same as the search space for remaining minimum system information (RMSI) reception, which is frequency division multiplexed (FDMed) or time division multiplexed (TDMed) with SSB burst set, or any other search space set with ID other than Type0-PDCCH candidate search space (CSS) set.

Therefore, there is a need to determine reference signal with monitoring occasion aligned with SS/PBCH blocks, where the reference signal can be used for paging indication in Type0-PDCCH CSS set or RRM measurement.

There is another need to determine periodic or semi-persistent reference signal with monitoring occasion aligned with paging occasion, where the reference signal can be used for paging indication and RRM measurement.

There is yet another need to determine aperiodic CSI-RS resources triggered by a paging DCI format, where the aperiodic resources can be used for RRM measurement.

There is yet another need to consider RRM measurement based on DM-RS of PDSCH for transmitting paging message.

The present disclosure relates to a pre-5th-generation (5G) or 5G communication system to be provided for supporting higher data rates beyond 4th-Generation (4G) communication system such as long term evolution (LTE). The disclosure relates to determining reference signal with monitoring occasion aligned with SS/PBCH blocks, where the reference signal can be used for paging indication in Type0-PDCCH CSS set or RRM measurement.

The present disclosure further relates to determining periodic or semi-persistent reference signal with monitoring occasion aligned with paging occasion, where the reference signal can be used for paging indication and RRM measurement. The disclosure also relates to determining aperiodic CSI-RS resources triggered by a paging DCI format, where the aperiodic resources can be used for RRM measurement. The disclosure finally relates to RRM measurement based on DM-RS of PDSCH for transmitting paging message.

In one embodiment, reference signal with configured time and frequency resources associated with SS/PBCH block (SSB) is provided. The reference signal at least carries information of cell ID, and thus is referred as cell-specific reference signal (C-RS or CRS) in the present disclosure.

Figure 7:
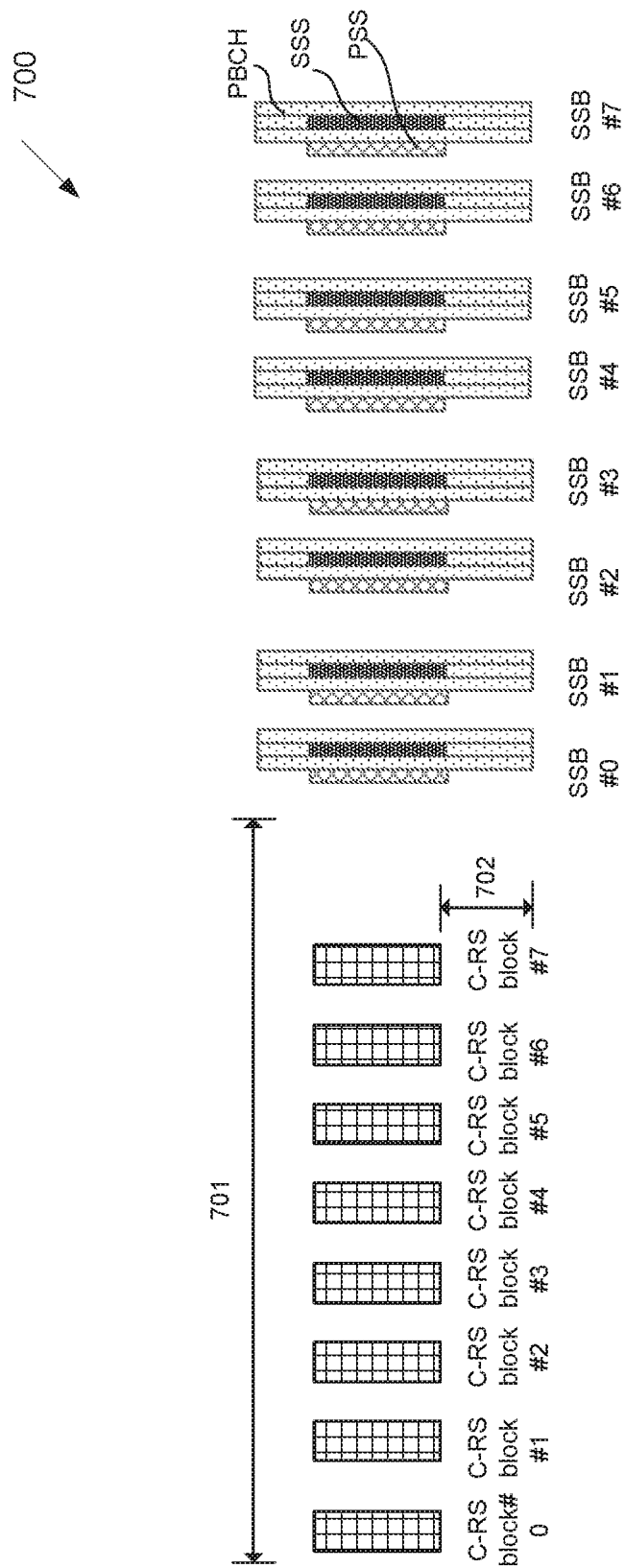
FIG. 7 illustrates an example C-RS associated with SS/PBCH block according to embodiments of the present disclosure.

FIG. 7 illustrates an example C-RS associated with SS/PBCH block 700 according to embodiments of the present disclosure. An embodiment of the C-RS associated with SS/PBCH block 700 shown in FIG. 7 is for illustration only.

In one example, the resources for C-RS can includes a set of S>=1 C-RS block(s), where S equals to the number of actually transmitted SSBs determined according to ssb-PositionsInBurst in SIB1. The UE may assume that the resources for the k-th C-RS block and the k-th actually transmitted SS/PBCH block is quasi co-located with respect to Doppler spread, Doppler shift, average gain, average delay, delay spread, and, when applicable, spatial Rx parameters.

In one example, the resources for C-RS can includes a set of S>=1 C-RS block(s), where S equals to the number of candidate SSBs within a half frame. The UE may assume that the resources for the k-th C-RS block and the k-th candidate SSB is quasi co-located with respect to Doppler spread, Doppler shift, average gain, average delay, delay spread, and, when applicable, spatial Rx parameters.

In one example, the aforementioned examples for the association between C-RS and SS/PBCH block can be supported, and the interpretation of the aforementioned examples depends on the indication in RMSI. For instance, if pagingSearchSpace is provided and the searchSpaceID is not 0, the UE uses the aforementioned second example; otherwise, the UE uses the aforementioned first example. In the time domain, a set of S C-RS blocks can be mapped into available OFDM symbols across one or more slots starting from slot n0^CRS_slot in radio frame with system frame number denoted as n^CRS_sfn in the ascending order of C-RS block index.

For C-RS resources mapping within a C-RS block, a C-RS resource can be mapped into X1>=1 OFDM symbol(s), and repeated for X2>=1 time(s) across available OFDM symbols within a slot, and the C-RS resource within a slot can be repeated for X3>=1 time(s) across X3 consecutive slots. In one example, X1 or X2 or X3 can be predefined in the specification of system operation. For example, X1=1, X2=2 or 1, X3=1 or 2. In another method, X1 or X2 or X3 can be provided to a UE in RMSI.

For determination of n0^CRS_slot and n^CRS_sfn, a UE can be provided with a time offset, O_CRS in the duration 701 as illustrated in FIG. 7, in unit of one slot, relative to n0^SSB_slot with SFN of n^SSB_sfn. For n0_SSB_slot, it can either be the slot index for the first transmitted SS/PBCH block or the slot index for the SS/PBCH block with candidate index as zero. O_CRS can either be predefined in the specification of the system operation, e.g., O_CRS=2, or be provided to a UE through higher layer signaling, for example, O_CRS can be included in RMSI.

In one example for determination of n0^CRS_slot and n^CRS_sfn, a set of C-RS blocks can be allocated after the associated SS/PBCH blocks. The UE can assume n0^CRS_slot=mod(n0^SSB_slot+O_CRS, N^frame_slots), where N^frame_slots is the number of slots per radio frame of the bandwidth part (BWP) where SS/PBCH blocks are transmitted. n^CRS_sfn=n^SSB_sfn+floor ((n0^SSB_slot+O_CRS)/N^frame_slots).

In another example for determination of n0^CRS_slot and n^CRS_sfn, a set of C-RS blocks can be allocated before the associated SS/PBCH blocks. The UE can assume n0^CRS_slot=N^frame_slots+n0^SSB_slot−O_CRS, and n^CRS_sfn=n^SSB_sfn−1, if (n0^SSB_slot−O_CRS)<0; otherwise n0^CRS_slot=n0^SSB_slot−O_CRS, and n^CRS_sfn=n^SSB_sfn, if (n0^SSB_slot−O_CRS)>=0.

In one example for determination of the available OFDM symbols for C-RS blocks transmission, the available OFDM symbols can be either fixed in the specification of the system operation or provided to the UE through higher layer signaling. In the aforementioned example, available OFDM symbols can be defined. In one example, available OFDM symbols indices are [2, 3, 4, 5, 8, 9, 10, 11] for subcarrier space of 15 KHz; [4, 5, 6, 7, 8, 9, 10, 11] or [2, 3, 4, 5, 6, 7, 8, 9] or [2, 3, 4, 5, 8, 9, 10, 11] for subcarrier space of 30 KHz; [4, 5, 6, 7, 8, 9, 10, 11] or [2, 3, 4, 5, 6, 7, 8, 9] for subcarrier space of 120 KHz; [8, 9, 10, 11, 12, 13] or [0, 1, 2, 3, 4, 5, 6, 7, 8, 9] or [4, 5, 6, 7, 8, 9, 10, 11, 12, 13] or [0, 1, 2, 3, 4, 5] for subcarrier space of 240 KHz.

In another example, available OFDM symbol indices are [4, 8] or [5, 9], [6, 10], wherein symbol index starts from 0. In the aforementioned example, the available OFDM symbols can be indicated by a bitmap broadcasted to UEs in RMSI.

In a frequency domain, C-RS blocks are can be transmitted over N^CRS_RBs>0 continuous resource blocks (RBs) starting from RB with index denoted as k0^CRS. For one example, a UE can determine k0^CRS based on an offset, O_RBs in 702 as illustrated in FIG. 7, k0^SSB.

The UE assumes k0^CRS=k0^SSB+O_RB, where O_RB can be zero, or a positive or negative integer. For one example, O_RB is relative to the first RB for SS/PBCH block. For another example, a UE can be determined k0^CRS based on an offset to the RB with index 0 in the BWP, wherein O_RB number of RBs relative to RB 0 in the active DL BWP.

For yet another example, O_RB is an offset relative to common RB 0. O_RB can either be defined in the specification of the system operation, e.g., O_RB=0, or provided to a UE through higher layer signaling, for example, O_RB can be included in RMSI. For determination of the bandwidth of C-RS transmission, N_RBs, N_RBs can be either defined in the specification of system operation, for example, N_RBs=20, or provided to a UE through higher layer signaling, for example, in RMSI.

For resource element (RE) mapping in the frequency domain, a C-RS resource can be mapped into available SCs with a subcarrier spacing, sf>=1, wherein sf can be either predefined in the specification of system operation, e.g., sf=4 or 1, or provided to a UE through higher layer signaling, e.g., via RSMI.

When C-RS is used for indicating paging PDCCH reception in Type0-PDCCH CSS set, a C-RS block can include Np>=1 C-RS resources, where each C-RS resource in the k-th (k<=S) C-RS block can be associated with a sub-group of UEs that monitor k-th PDCCH monitoring occasion in Type0-PDCCH CSS set corresponds to the k-th SS/PBCH block.

For example, a UE can determine the associated C-RS resources index p, such that p=floor(UE_ID/(N*Ns)) mod Np, where a UE_ID is 5G-S-TMSI mod 1024, N is a number of total paging frames in a DRX cycle, and Ns is the number of paging occasions for a PF. Np can be either predefined in the specification of system operation, for example, Np=4, or provided to the UE through higher layer signaling, for example, in RMSI.

Figure 8:
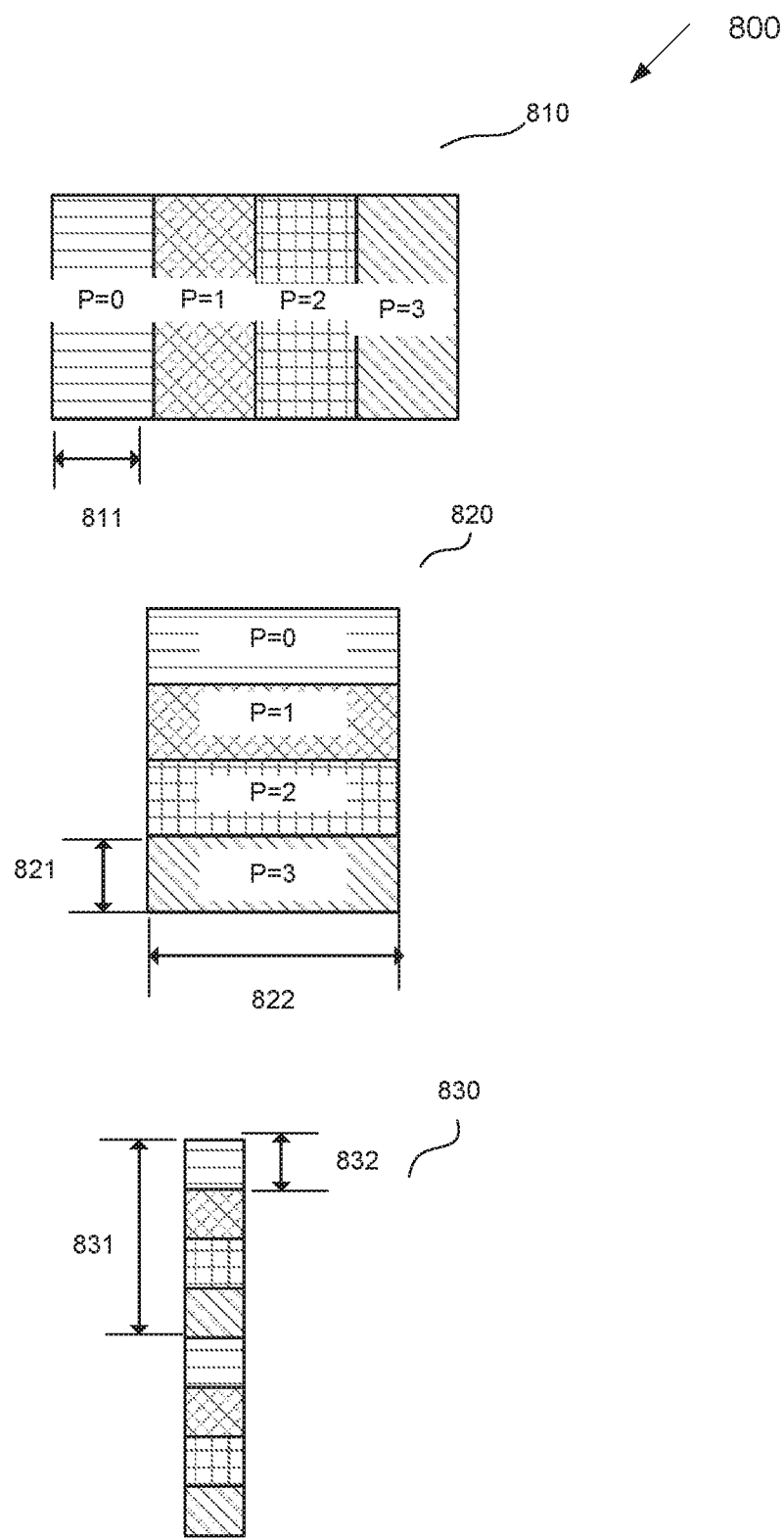
FIG. 8 illustrates an example resource element mapping for a C-RS block includes Np=4 C-RS resources according to embodiments of the present disclosure.

FIG. 8 illustrates an example resource element mapping 800 for a C-RS block include Np=4 C-RS resources according to embodiments of the present disclosure. An embodiment of the resource element mapping 800 shown in FIG. 8 is for illustration only.

For resource element (RE) mapping of Np>=1 C-RS resources within a C-RS block, at least one of the following mapping patterns can be utilized in various embodiments. In one example, a mapping pattern as illustrated in 810 in FIG. 8, the Np>=1 C-RS resources are time division multiplexed (TDMed), where Np>=1 C-RS resources are mapped into available OFDM symbols in the ascending order of C-RS resource index, p. Each C-RS resource can be mapped into N_OFDMs>=1, in 811, OFDM symbols. In the frequency domain, Np>=1 C-RS resources are mapped into assigned bandwidth of C-RS transmission, e.g., N^CRS_RBs continuous RBs. N_OFDMs can be either defined in the specification of system operation, for example, N_OFDMs=1, or provided to UEs through higher layer signaling, for example, broadcasted to UEs in RMSI.

In another example, a mapping pattern as illustrated in 820 in FIG. 8, the Np>=1 C-RS resources are frequency division multiplexed (FDMed), where Np>=1 C-RS resources are mapped into preconfigured bandwidth, i.e., N^CRS_RB continuous RBs, in the ascending order of C-RS resource index, p. Each C-RS resource occupies N0^CRS_RB>=1, in 821, continuous RBs. In the time domain, Np>=1 C-RS resources are mapped into N_OFDMs>=1 OFDM symbols. N0^CRS_RB and N_OFDMs can be either defined in the specification of system operation, for example, N_OFDMs=4, N0^CRS_RB=2 or N^CRS_RB/Np, or provided to the UEs through higher layer signaling, for example, broadcasted to UEs in RMSI.

In yet another example, a mapping pattern as illustrated in 830 in FIG. 8, each C-RS resource is transmitted in N1_SC>=1, in 832, subcarriers every N2_SC, in 831, subcarriers in the assigned bandwidth of C-RS block, N^CRS_RB, where N1_SC<N2_SC. For the first subcarrier of ach C-RS resource, p, there is a frequency shift in terms of CS_p>=0, subcarriers relative to the first available subcarrier for the entire C-RS transmission. N1_SC, N2_SC, and CS_p can be either defined in the specification of system operation, e.g., N1_SC=1, N2_SC=4, CS_p=p* N1_SC, or provided to the UEs through higher layer signaling, for example, in RMSI.

For the functionality of C-RS, at least one of the following examples can be utilized in various embodiments. In one example, C-RS can be used to indicate the transmission of paging PDCCH from a gNB, i.e., a DCI format with cyclic redundancy check (CRC) scrambled by paging-radio network temporary identification (P-RNTI). For k-th C-RS block, C-RS corresponds to the PDCCH monitoring occasion(s) for paging with DMRS antenna port quasi co-located with k-th transmitted SS/PBCH block or k-th candidate SS/PBCH block. An indication of whether or not associated paging PDCCH is transmitted by a gNB can be either indicated by the presence of C-RS or carried in C-RS, for example initialization of sequence generation of C-RS. In the aforementioned example, C-RS is transmitted on demand by a gNB and can be referred as wake up signal (WUS). In the aforementioned example, the C-RS is transmitted periodically in preconfigured time and frequency domain resources.

When the UE does not detect the C-RS resource with paging PDCCH indication, the UE can either monitor the corresponding PDCCH MO for Paging PDCCH reception or skip monitoring the corresponding PDCCH MO for Paging PDCCH reception according to the specification of the system operation or a configuration provided by higher layers, e.g., RMSI.

In another example, C-RS can be used as reference signal for RRM or RLM measurement. C-RS can be used for reference signal received power (RSRP) measurement or reference signal received quality (RSRQ) measurement. C-RS based RSRP (C-RSRP) or RSRQ (C-RSRQ) can be applicable for RRC_CONNECTED intra-frequency or RRC_IDLE intra-frequency or RRC_IDLE inter-frequency or RRC_INACTIVE intra-frequency or RRC_INACTIVE inter-frequency measurement.

In yet another example, C-RS can carry timing information, I_t, and be used for can be used for time or frequency tracking. In one instance, I_t can include the slot index where C-RS resource is transmitted. In another example, I_t can include OFDM symbol index where C-RS resource is transmitted. The UE may base the timing of the C-RS resource on the timing of the serving cell that transmits the C-RS.

In one example for the transmission of C-RS, C-RS can be transmitted periodically in a serving cell based on the semi-static configuration indicated by the serving cell.

In another example for the transmission of C-RS, the transmission of C-RS associated with SSB can be enabled or disabled based on an indication in physical layer signal. In one example for (de)activation of CRS, N>=1 sets of CRS blocks can be provided or configured by a serving cell, and each set of CRS blocks associated with a SSB can be activated and deactivated by a DCI format transmitted in the search space set 0 with DRMS of PDCCH quasi-located (QCLed) with the SSB. In one example, a field for (de)activation of a set CRS blocks can be included in the DCI format with CRC scrambled by P-RNTI in a PO associated with the SSB. The field can be included in reserved bits of short message as defined in NR standard specification.

In one example, the field can indicate the ID of the set of positioning reference signal (PRS) block that needs to be activated or deactivated. If the indicated set of CRS blocks is activated before the reception of the indication, the indication means to deactivate the indicated set of CRS blocks; otherwise if the indicated set of CRS blocks is inactivated before the reception of the indication, the indication means to activate the indicated set of CRS blocks. To avoid misunderstanding of the activated CRS resources, the serving cell can maintain a list of activated or inactivated set(s) of CRS blocks per PO in RMSI.

In another example, the field in a DCI format can be a binary bit to indicate whether or not the set of CRS block(s) associated the PO where the UE receives the DCI format. For a UE monitors DCI format in a PO, if the set of CRS blocks associated with the PO is deactivated, the UE assumes no transmission of CRS blocks associated the PO, otherwise the UE assumes CRS blocks associated with the PO is available.

In another example for (de)activation of CRS, an indication for activation of deactivation of CRS associated with SSB can be included in PBCH or RMSI. In one instance, the indication can a binary bit to indicate whether or not all sets of CRS blocks are available or not. In another instance, the indication can be a list of CRS blocks set index that are activated. The UE only assumes the CRS resources associated with the CRS block set that is included in the list are available. In yet another instance, the indication can be a list of CRS resource IDs that are activated. The UE only assumes the CRS resources with IDs included in the list are available.

In yet another example for (de)activation of CRS, an indication for activation of CRS associated with SSB can be included by higher layer parameter, e.g., SuspendConfig in RRCRelease, when a UE is triggered to switch from RRC_CONNECTED state to RRC_IDLE/INACTIVE state. In one instance, the indication can a binary bit to indicate whether or not all sets of CRS blocks are available or not. In another instance, the indication can be a list of CRS blocks set index that are activated. The UE only assumes the CRS resources associated with the CRS block set that is included in the list are available.

Figure 9:
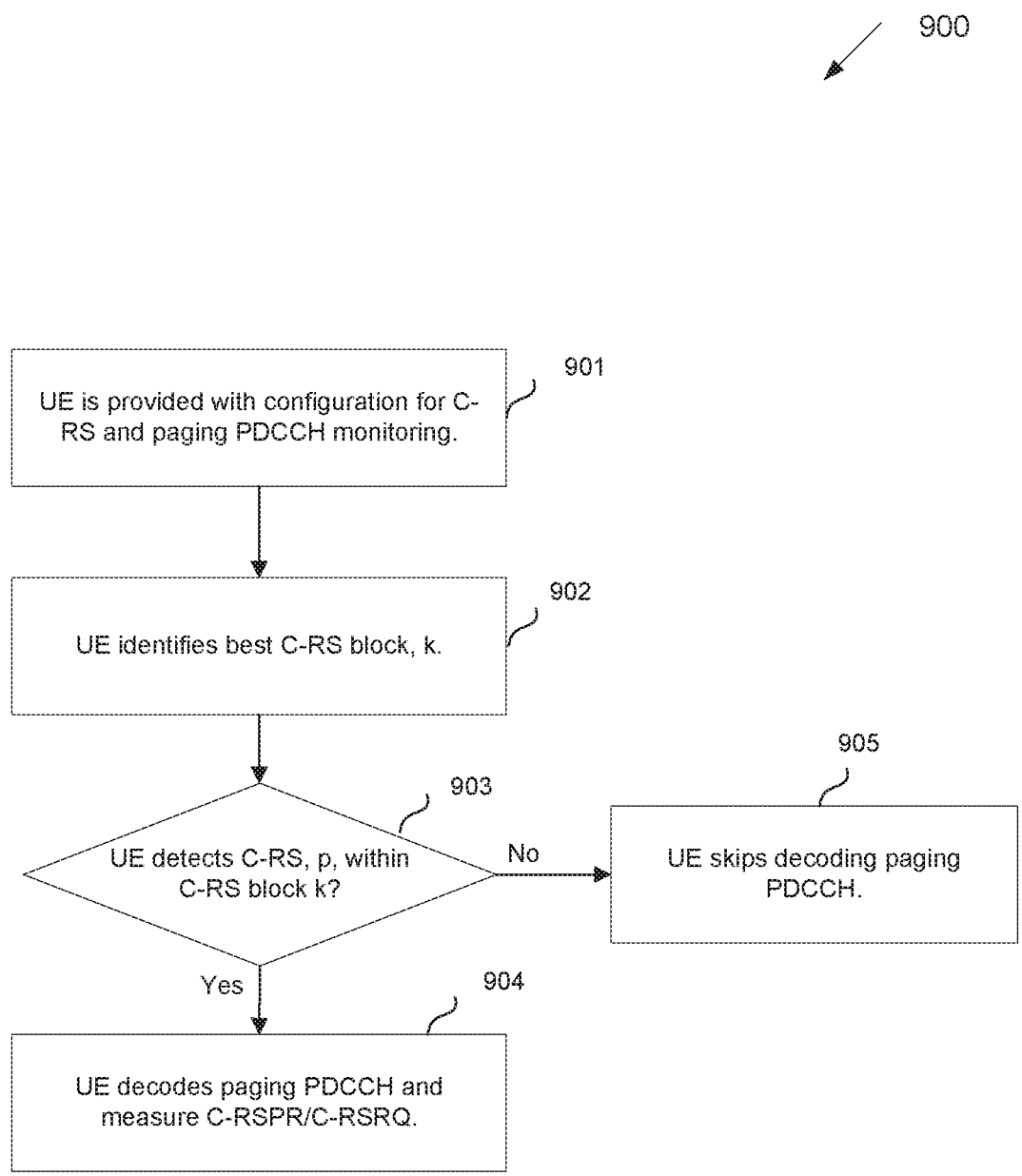
FIG. 9 illustrates a flow chart of a UE procedure for paging PDCCH reception indicated by C-RS according to embodiments of the present disclosure.

FIG. 9 illustrates a flow chart of a UE procedure 900 for paging PDCCH reception indicated by C-RS according to embodiments of the present disclosure. An embodiment of the UE procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE is provided with a configuration of C-RS and paging PDCCH monitoring through broadcasted RMSI in step 901. The UE determines the best C-RS block with index k when C-RS is transmitted in a set of S>=1 C-RS blocks; in one example, the UE can identify the best C-RS block based on monitoring of SS/PBCH blocks in step 902. The UE determines whether or not to detect C-RS resource with index of p, within the identified C-RS block, k in step 903; p can be determined by a UE ID, such that p=floor(UE_ID/(N*Ns)) mod Np, as defined in other part of this disclosure. When the UE detects the C-RS resource with index of p, the UE then decodes paging PDCCH in k-th PDCCH monitoring occasion associated with k-th SS/PBCH block in assigned PO, and measures RSRP or RSRQ based on the detected C-RS resource, i.e., C-RSRP or C-RSRQ in step 904. When the UE does not detect the C-RS resource, p, the UE then skips PDCCH monitoring in the next paging occasion i step 905.

Figure 10:
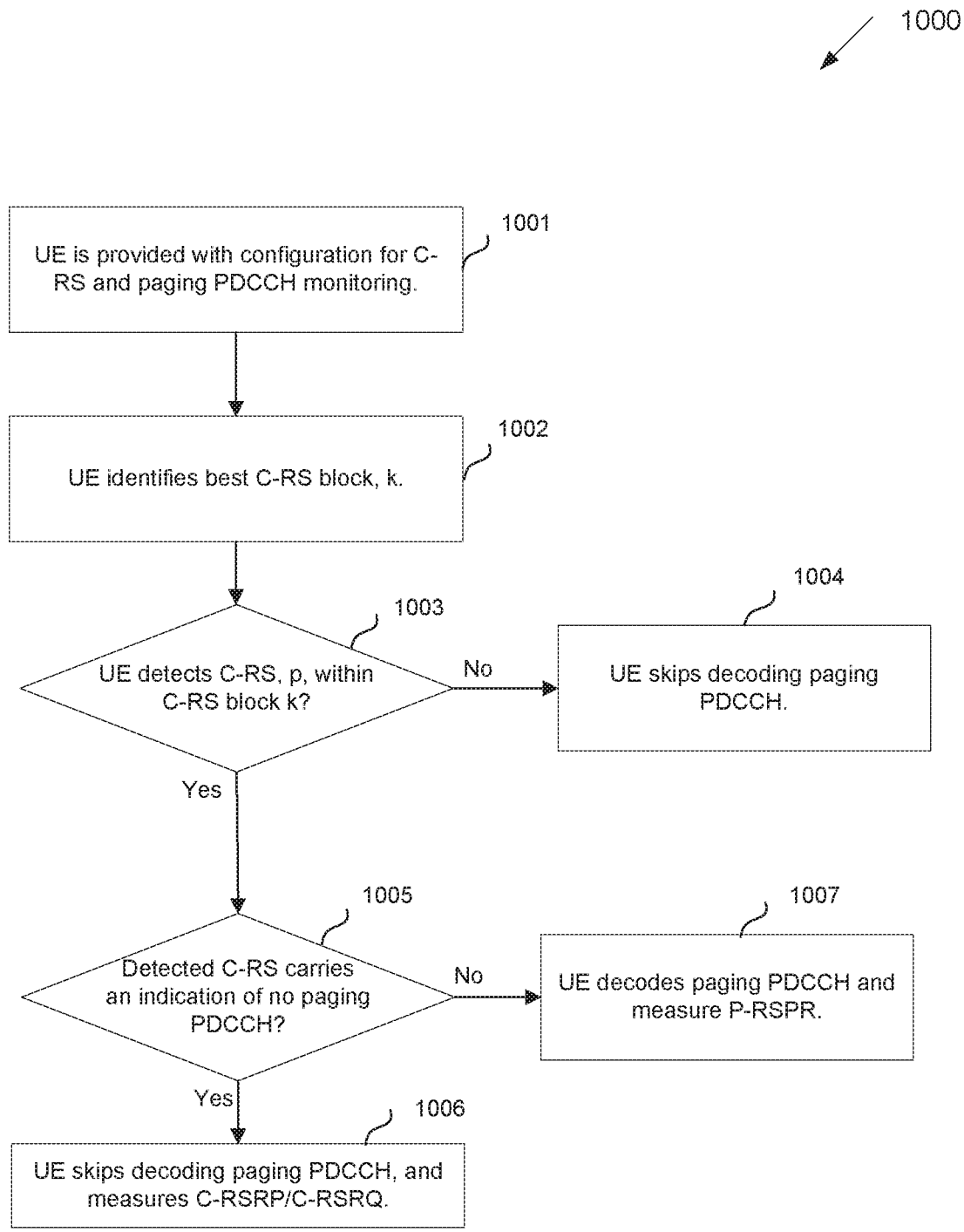
FIG. 10 illustrates a flow chart of a UE procedure for a configuration of C-RS and paging PDCCH monitoring through broadcasted RMSI according to embodiments of the present disclosure.

FIG. 10 illustrates a flow chart of a UE procedure 1000 for a configuration of C-RS and paging PDCCH monitoring through broadcasted RMSI according to embodiments of the present disclosure. An embodiment of the UE procedure 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, a UE is provided with a configuration of C-RS and paging PDCCH monitoring through broadcasted RMSI in step 1001. The UE determines the best C-RS block with index k when C-RS is transmitted in a set of S>=1 C-RS blocks; for example, the UE can identify the best C-RS block based on monitoring of SS/PBCH blocks in step 1002. The UE determines whether or not to detect C-RS resource with index of p, within the identified C-RS block, kin step 1003; p can be determined by the UE ID, such that p=floor(UE_ID/(N*Ns)) mod Np, as defined in other part of this disclosure. When the UE detects the C-RS resource with index of p, the UE then determines whether or not the detected C-RS resource carries an indication for no paging PDCCH monitoring in step 1005.

When the detected C-RS resource p indicates the UE to skip paging PDCCH reception, the UE then skips PDCCH monitoring in the next PO, but the UE still measures RSRP based on the detected C-RS resource, i.e., C-RSRP in step 1006. When the detected C-RS resource p indicates the UE to not skip paging PDCCH reception, the UE then decodes paging PDCCH in k-th PDCCH monitoring occasion associated with k-th SS/PBCH block in assigned PO, and measures RSRP or RSRQ based on the detected C-RS resource, i.e., C-RSRP or C-RSRQ in step 1007. When the UE does not detect the C-RS resource, p, the UE then skip PDCCH decoding in next paging occasion in step 1004.

For the sequence generation of C-RS, a C-RS resource can be any of the following: a C-RS resource can be a CSI-RS resource as defined in NR standard specification; a C-RS resource can be generated from a pseudo-random (PN) sequence with binary phase shift keying (BPSK) or quadrature phase shift keying (QPSK) modulation as defined in NR standard specification; or a C-RS resource can be a resource for TRS as defined in NR standard specification.

For determination of the antenna port for C-RS resources, the UE assumes the antenna port for all the available C-RS resources are same, and the number of antenna ports is one.

In one embodiment, reference signal to indicate the transmission of paging PDCCH from a gNB is provided, i.e., a DCI format with CRC scrambled by P-RNTI. The reference signal is referred as paging reference signal (PRS) in this disclosure. The PRS associated with paging PDCCH monitoring can be transmitted in time and frequency resources with configuration associated with paging occasion (PO).

The transmission of PRS can be a set of S>=1 PRS block(s), where S equals with the number of actually transmitted SSBs determined according to ssb-PositionsInBurst in SIB1. The UE may assume that the k-th transmitted PRS block and DMRS antenna port of paging PDCCH in k-th PDCCH monitoring occasion (MO) are quasi-co-located with respect to Doppler spread, Doppler shift, average gain, average delay, delay spread, and, when applicable, spatial Rx parameters.

Figure 11:
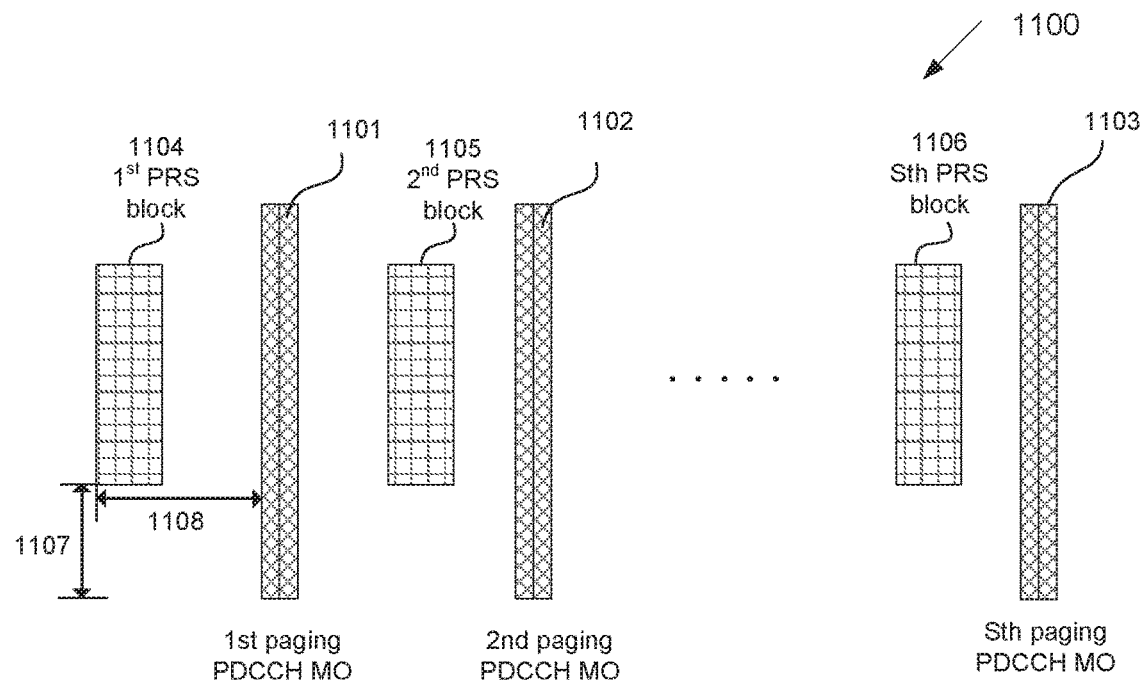
FIG. 11 illustrates an example PRS transmission associated with a PO according to embodiments of the present disclosure.

FIG. 11 illustrates an example PRS transmission associated with a PO 1100 according to embodiments of the present disclosure. An embodiment of the PRS transmission associated with a PO 1100 shown in FIG. 11 is for illustration only.

As illustrated in FIG. 11, the PRS transmission associated with the PO 1100 includes a $1^{st}$ paging PDCCH MO 1101, a $2^{nd}$ paging PDCCH MO 1102, a S-th paging PDCCH MO 1103, a $1^{st}$ PRS block 1104, a $2^{nd}$ PRS block 1105, a S-th PRS block 1106.

In one example for PRS transmission associated with a PO in a BWP, as illustrated in FIG. 11, the k-th (k=1, ..., S) PRS block can be mapped into time and frequency resources with configuration associated with k-th (k=1, ..., S) PDCCH monitoring occasion in the PO. In a time domain, a UE can be provided with an offset in terms of number of slots, O^PRS_slot>=0, in 1108, between the slot index of a PRS block and the slot index of corresponding paging PDCCH monitoring occasion.

For determining the start or lowest RB for a PRS block transmission, a UE can be provided with a RB offset, O^PRS_RBs>=0, in 1107, relative to the start RB of the BWP or the start RB of the associated CORESET for paging PDCCH monitoring. For one example, a UE can be provided with a RB offset, O^PRS_RBs>=0 relative to the first RB for SS/PBCH block For another example, a UE can be provided with a RB offset, O^PRS_RBs>=0, relative to RB 0 in the active DL BWP. For yet another example, a UE can be provided with a RB offset, O^PRS_RBs>=0, relative to common RB 0. O^PRS_slot and O^PRS_RBs can be either defined in the specification of the system operation, for example, O^PRS_slot=1, O^PRS_RBs=0, or provided to the UE through higher layer signaling, for example, in RMSI.

Figure 12:
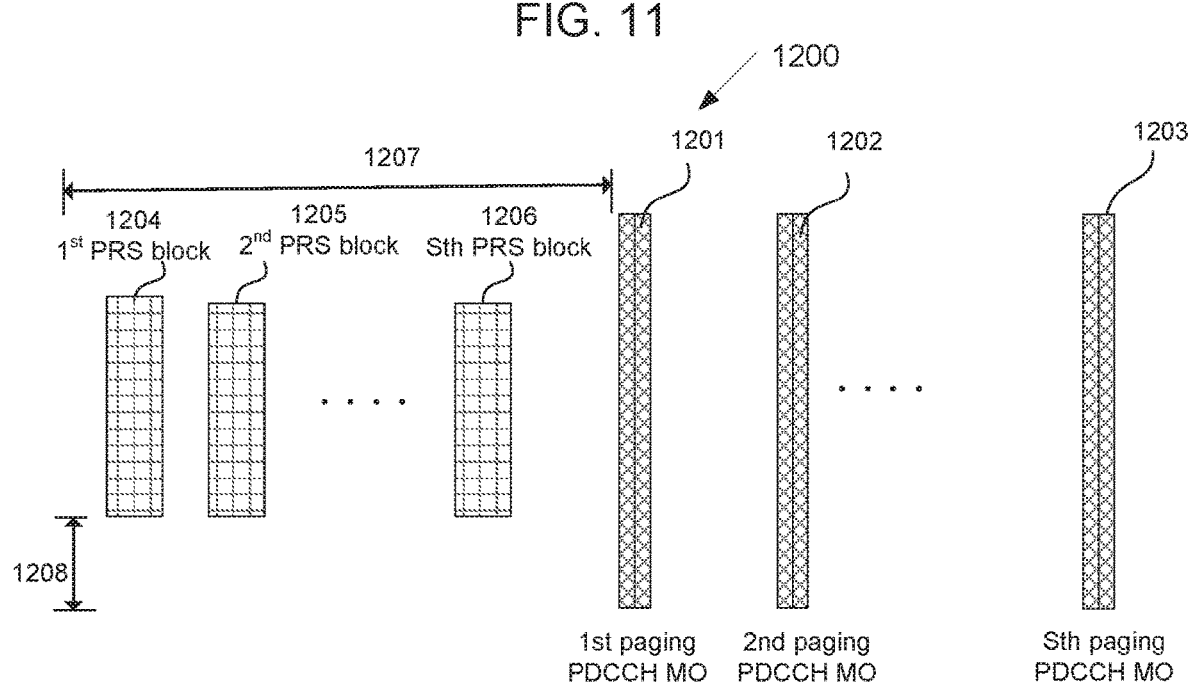
FIG. 12 illustrates another example PRS transmission associated with a PO according to embodiments of the present disclosure.

FIG. 12 illustrates another example PRS transmission associated with a PO 1200 according to embodiments of the present disclosure. An embodiment of the PRS transmission associated with a PO 1200 shown in FIG. 12 is for illustration only.

As illustrated in FIG. 12, the PRS transmission associated with the PO 1200 includes a $1^{st}$ paging PDCCH MO 1201, a $2^{nd}$ paging PDCCH MO 1202, a S-th paging PDCCH MO 1203, a $1^{st}$ PRS block 1204, a $2^{nd}$ PRS block 1205, a S-th PRS block 1206.

In one example for PRS transmission associated with a PO in a BWP, as illustrated in FIG. 12, a set of S>=1 PRS blocks are transmitted in front of the associated PO over one or more consecutive slots. In the time domain, a UE can be provided with a time offset in terms of number of slots, O^PRS_slot>=0, in 1207, between the first slot index of PRS set and the slot index of the first PDCCH monitoring occasion in the PO, in 1201. For determining the start or lowest RB for the PRS set transmission, a UE can be provided with a RB offset, O^PRS_RBs>=0, relative to the start/lowest RB of the BWP or the start/lowest RB of the associated CORESET for paging PDCCH monitoring.

For one example, a UE can be provided with a RB offset, O^PRS_RBs>=0, in 1208, relative to the first RB for SS/PBCH block For another example, a UE can be provided with a RB offset, O^PRS_RBs>=0, relative to RB 0 in the active DL BWP. For yet another example, a UE can be provided with a RB offset, O^PRS_RBs>=0, relative to common RB 0. O^PRS_slot and O^PRS_RBs can be either defined in the specification of the system operation, for example, O^PRS_slot=2, O^PRS_RBs=0, or provided to the UE through higher layer signaling, for example, in RMSI.

For RE mapping in the frequency domain, a PRS resource can be mapped into available SCs with a subcarrier spacing, sf>=1, wherein sf can be either predefined in the specification of system operation, e.g., sf=4 or 1, or provided to a UE through higher layer signaling, e.g., via RSMI.

The S PRS blocks within a PRS set can be mapped into available OFDM symbols across one or more slots starting from the first slot for PRS set transmission in the ascending order of PRS block index.

For PRS resources mapping within a PRS block, a PRS resource can be mapped into X1>=1 OFDM symbol(s), and repeated for X2>=1 time(s) across available OFDM symbols within a slot, and the PRS resource within a slot can be repeated for X3>=1 time(s) across X3 consecutive slots. In one method, X1 or X2 or X3 can be predefined in the specification of system operation. For example, X1=1, X2=2 or 1, X3=1 or 2. In another method, X1 or X2 or X3 can be provided to a UE in RMSI.

The available OFDM symbols for PRS transmission can be either fixed in the specification of the system operation or provided to the UE through higher layer signaling. In the former case, available OFDM symbols can be defined. In one example, the available OFDM symbols indices are [2, 3, 4, 5, 8, 9, 10, 11] for subcarrier space of 15 KHz; [4, 5, 6, 7, 8, 9, 10, 11] or [2, 3, 4, 5, 6, 7, 8, 9] or [2, 3, 4, 5, 8, 9, 10, 11] for subcarrier space of 30 KHz; [4, 5, 6, 7, 8, 9, 10, 11] or [2, 3, 4, 5, 6, 7, 8, 9] for subcarrier space of 120 KHz; [8, 9, 10, 11, 12, 13] or [0, 1, 2, 3, 4, 5, 6, 7, 8, 9] or [4, 5, 6, 7, 8, 9, 10, 11, 12, 13] or [0, 1, 2, 3, 4, 5] for subcarrier space of 240 KHz.

In another example, available OFDM symbol indices are [4, 8] or [5, 9], [6, 10], wherein symbol index starts from 0. In the latter case, the available OFDM symbols per slot or per 1 ms or per 0.5 ms can be indicated by a bitmap broadcasted to UEs in RMSI.

A PRS block can include Np>=1 PRS resources, where each C-RS resource in k-th (k<=S) PRS block can be associated with a sub-group of UEs that monitor k-th PDCCH monitoring occasion in the PO. For example, a UE can determine the associated PRS resources index p, such that p=floor(UE_ID/(N*Ns)) mod Np, where UE_ID is 5G-S-TMSI mod 1024, N is a number of total paging frames in a DRX cycle, and Ns is the number of paging occasions for a PF. Np can be either predefined in the specification of system operation, for example, Np=4, or provided to the UE through higher layer signaling, for example, in RMSI.

Figure 13:
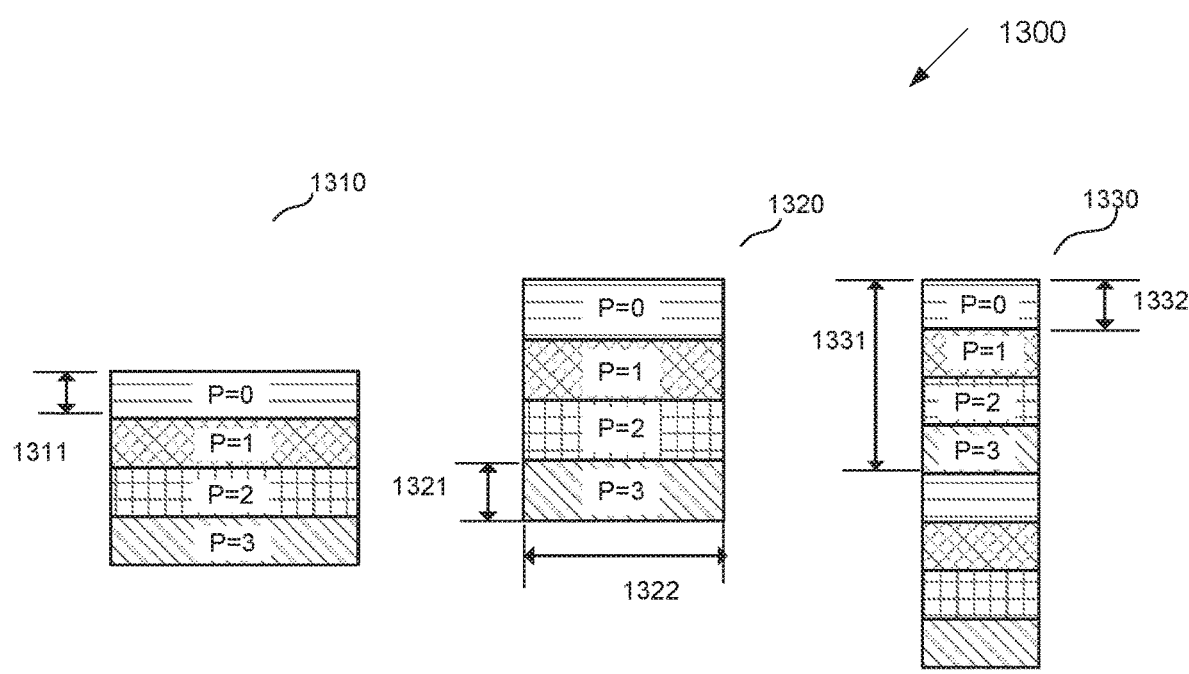
FIG. 13 illustrates an example resource element mapping for a PRS block includes Np=4 PRS resources according to embodiments of the present disclosure.

FIG. 13 illustrates an example resource element mapping 1300 for a PRS block includes Np=4 PRS resources according to embodiments of the present disclosure. An embodiment of the resource element mapping 1300 shown in FIG. 13 is for illustration only.

For resource element (RE) mapping of Np>=1 PRS resources within a PRS block, at least one of the following mapping patterns can be utilized in various embodiments. In one example for a mapping pattern as illustrated in 1310 in FIG. 13, the Np>=1 PRS resources are time division multiplexed (TDMed), where Np>=1 PRS resources are mapped into available OFDM symbols in the ascending order of PRS resource index, p. Each PRS resource can be mapped into N_OFDMs>=1, in 1311, OFDM symbols. In the frequency domain, Np>=1 PRS resources are mapped into assigned bandwidth of PRS transmission, e.g., N^PRS_RBs continuous RBs. N_OFDMs can be either defined in the specification of system operation, for example, N_OFDMs=1, or provided to UEs through higher layer signaling, for example, in RMSI.

In another example for a mapping pattern 1320 as illustrated in FIG. 13, the Np>=1 PRS resources are frequency division multiplexed (FDMed), where Np>=1 PRS resources are mapped into preconfigured bandwidth, i.e., N^PRS_RB continuous RBs, in the ascending order of PRS resource index, p. Each PRS resource occupies N0^PRS_RB>=1, in 1321, continuous RBs. In a time domain, Np>=1 PRS resources are mapped into N_OFDMs>=1 OFDM symbols in 1322. N0^PRS_RB and N_OFDMs can be either defined in the specification of system operation, for example, N_OFDMs=4, N0^PRS_RB=2 or N^PRS_RB/Np, or provided to the UEs through higher layer signaling, for example, in RMSI.

In yet another example for a mapping pattern 1330 as illustrated in FIG. 13, each PRS resource is transmitted in N1_SC>=1, in 1332, subcarriers every N2_SC, in 1331, subcarriers in the assigned bandwidth of PRS block, N^PRS_RB, where N1_SC<N2_SC. For the first subcarrier of ach PRS resource, p, there is a frequency shift in terms of CS_p>=0, subcarriers relative to the first available subcarrier for the entire PRS transmission. N1_SC, N2_SC, and CS_p can be either defined in the specification of system operation, e.g., N1_SC=1, N2_SC=4, CS_p=p*N1_SC, or provided to the UEs through higher layer signaling, for example, in RMSI.

For the functionality of PRS, at least one of the following examples can be utilized in various embodiments. In one example, PRS can be used to indicate the transmission of paging PDCCH from a gNB, i.e., a DCI format with CRC scrambled by P-RNTI. For k-th PRS block, PRS corresponds to the k-th PDCCH monitoring occasion(s) for paging in the associated PO. An indication of whether or not associated paging PDCCH is transmitted by the gNB can be either indicated by the presence of PRS or carried in PRS, for example initialization of sequence generation of PRS resource. In the former case, PRS is transmitted on demand by the gNB and can be referred as wake up signal (WUS). In the latter case, the PRS is transmitted periodically in preconfigured time and frequency domain resources. When a UE does not detect the PRS resource with paging PDCCH indication, the UE can either monitor the corresponding PDCCH MO for Paging PDCCH reception or skip monitoring the corresponding PDCCH MO for Paging PDCCH reception according to the specification of the system operation or a configuration provided by higher layers, e.g., RMSI.

In another example, PRS can be used as reference signal for RRM or RLM measurement. PRS can be used for reference signal received power (RSRP) measurement or reference signal received quality (RSRQ). PRS based RSRP (P-RSRP) or RSRQ (P-RSRQ) is applicable for RRC_CONNECTED intra-frequency or RRC_IDLE intra-frequency or RRC_IDLE inter-frequency or RRC_INACTIVE intra-frequency or RRC_INACTIVE inter-frequency measurement.

In yet another example, PRS can carry timing information, I_t, and be used for can be used for time or frequency tracking. In one example of I_t can include the slot index where PRS resource is transmitted. In another example, I_t can include OFDM symbol index where PRS resource is transmitted. The UE may base the timing of the PRS resource on the timing of the serving cell that transmits the PRS.

Figure 14A:
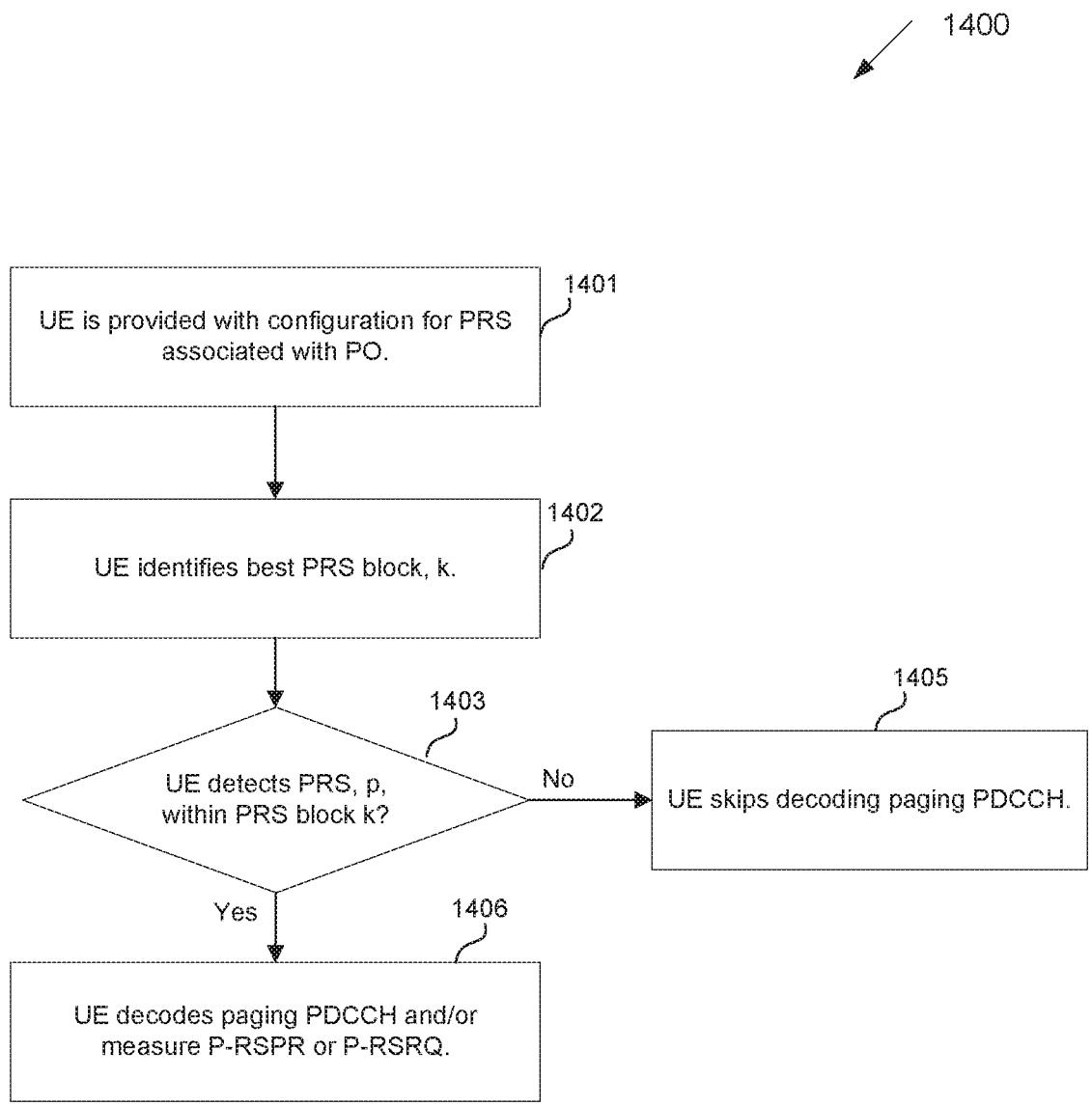
FIG. 14A illustrates a flow chart of a UE procedure for reception of PRS resources according to embodiments of the present disclosure.

FIG. 14A illustrates a flow chart of a UE procedure 1400 for reception of PRS resources according to embodiments of the present disclosure. An embodiment of the UE procedure 1400 shown in FIG. 14A is for illustration only. One or more of the components illustrated in FIG. 14A can be implemented in specialized circuitry configured to perform the noted functions or one or more of the components can be implemented by one or more processors executing instructions to perform the noted functions.

As illustrated in FIG. 14A, a UE is provided with a configuration of PRS associated with paging occasion (PO) through broadcasted RMSI in step 1401. The UE determines the best PRS block with index k when C-RS is transmitted in a set of S>=1 CRS blocks; in one example, the UE can identify the best PRS block based on monitoring of SS/PBCH blocks in step 1402. The UE determines whether or not detects PRS resource with index of p, within the identified PRS block, k, in step 1403; p can be determined by a UE ID, such that p=floor(UE_ID/(N*Ns)) mod Np, as defined in other part of this disclosure.

When the UE detects the PRS resource with index of p, the UE then decodes paging PDCCH in k-th PDCCH monitoring occasion associated with k-th SS/PBCH block in assigned PO, and measures RSRP or RSRQ based on the detected PRS resource, i.e., P-RSRP or P-RSRQ, in step 1404. When the UE does not detect the PRS resource, p, the UE then skips PDCCH monitoring in the next paging occasion in step 1405.

In one example for the transmission of PRS, PRS can be transmitted periodically in a serving cell based on the semi-static configuration indicated by the serving cell.

In another example for the transmission of PRS associated with PO, PRS can be enabled or disabled based on an indication in physical layer signal. In one instance for (de)activation of PRS, N>=1 sets of PRS blocks can be provided or configured by a serving cell, and each set of PRS blocks associated with a PO can be activated and deactivated by a paging DCI format transmitted in the PO. A field for (de)activation of a set PRS blocks can be included in the DCI format with CRC scrambled by P-RNTI. The field can be included in reserved bits of short message as defined NR standard specification.

For example, the field can indicate the ID of the set of PRS block that needs to be activated or deactivated. If the indicated set of PRS blocks is activated before the reception of the indication, the indication means to deactivate the indicated set of PRS blocks; otherwise if the indicated set of PRS blocks is inactivated before the reception of the indication, the indication means to activate the indicated set of PRS blocks. To avoid misunderstanding of the activated PRS resources, the serving cell can maintain a list of activated or inactivated set(s) of PRS blocks per PO in RMSI.

For another example, the field in a DCI format can be a binary bit to indicate whether or not the set of PRS block(s) associated the PO where the UE receives the DCI format. For a UE monitors DCI format in a PO, if the set of PRS blocks associated with the PO is deactivated, the UE assumes no transmission of PRS blocks associated the PO, otherwise the UE assumes PRS blocks associated with the PO is available.

In one example for (de)activation of PRS, an indication for activation of deactivation of PRS associated with PO can be included in PBCH or RMSI. In one instance, the indication can a binary bit to indicate whether or not all sets of PRS blocks are available or not. In another instance, the indication can be a list of PRS blocks set index that are activated. The UE only assumes the PRS resources associated with the PRS block set that is included in the list are available.

In one example for (de)activation of PRS, an indication for activation of PRS associated with PO can be included by higher layer parameter, e.g., SuspendConfig in RRCRelease, when a UE is triggered to switch from RRC_CONNECTED state to RRC_IDLE/INACTIVE state. In one instance, the indication can a binary bit to indicate whether or not all sets of PRS blocks are available or not. In another instance, the indication can be a list of PRS blocks set index that are activated. The UE only assumes the PRS resources associated with the PRS block set that is included in the list are available.

Figure 14B:
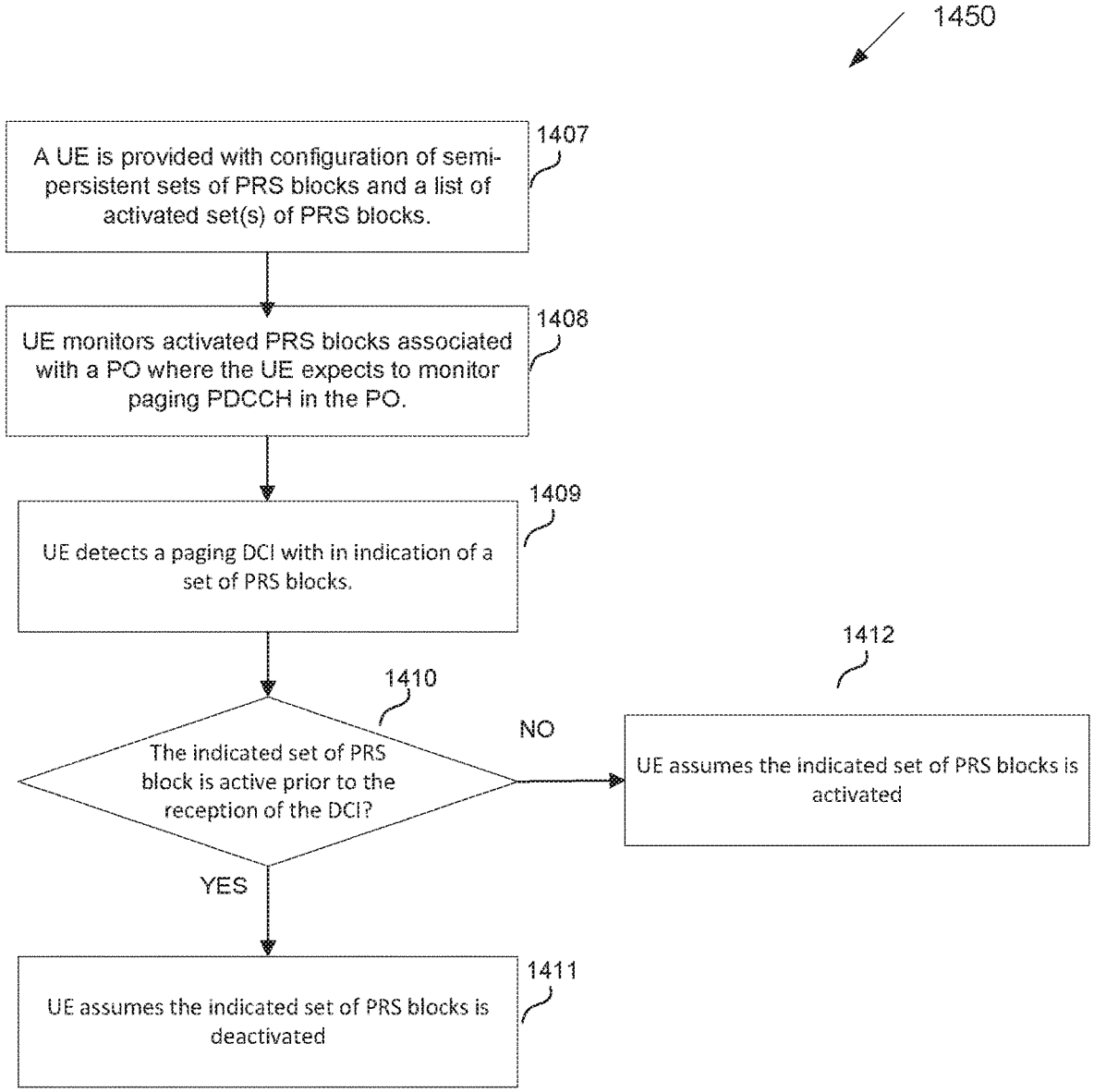
FIG. 14B illustrates another flow chart of a UE procedure for reception of PRS resources according to embodiments of the present disclosure.

FIG. 14B illustrates another flow chart of a UE procedure 1450 for reception of PRS resources according to embodiments of the present disclosure. An embodiment of the UE procedure 1450 shown in FIG. 14B is for illustration only. One or more of the components illustrated in FIG. 14B can be implemented in specialized circuitry configured to perform the noted functions or one or more of the components can be implemented by one or more processors executing instructions to perform the noted functions.

As illustrated in FIG. 14B, a UE can be provided with a configuration of N>=1 semi-persistent sets of PRS blocks, and a list of activated or inactivated sets of PRS blocks per PO through the RMSI of a serving cell in step 1407. The UE then monitors activated PRS blocks associated with a PO where the UE expects to monitor paging PDCCH in the PO in step 1408. The UE detects a DCI format with CRC scrambled by P-RNTI in predetermined PO, and the DCI format carries an ID of semi-persistent set of PRS blocks in step 1409.

The UE determines whether or not the indicated set of PRS blocks is activated before the reception of the DCI format in step 1410. When the indicated set of PRS blocks is activated before the reception of the DCI format, the UE assumes the indicated set of PRS blocks is deactivated by the DCI and stops receiving and monitoring the corresponding PRS resources in step 1411. Otherwise, when the indicated set of PRS blocks is deactivated before the reception of the DCI format, the UE assumes the indicated set of PRS blocks is activated by the DCI, and the UE starts monitoring or receiving the corresponding PRS resources in step 1412.

For the sequence generation of PRS, a PRS resource can be any of the followings: a-PRS resource can be a CSI-RS resource as defined in NR standard specification; a PRS resource can be generated from a pseudo-random (PN) sequence with BPSK or QPSK modulation as defined in NR standard specification; and/or a PRS resource can be a TRS resource as defined in NR standard specification.

In one embodiment, aperiodic CSI-RS resources that is available for a UE in RRC_IDLE/INACTIVE state are provided. The CSI-RS resources can be used for RRM measurements or time/frequency synchronization.

In one example, the aperiodic CSI-RS resource can be triggered using a field in a paging DCI format, e.g., a DCI format with CRC scrambled by P-RNTI, in paging search space set. In one example, the field can be included in short message of paging DCI format as defined in NR standard specification. In one instance, the aperiodic CSI-RS triggered by a paging DCI format can be applicable to RRC_IDLE and/or RRC_INACTIVE only. In another instance, the aperiodic CSI-RS based RRM measurement triggered by a paging DCI format can be applicable to intra-frequency measurement only. For example, aperiodic CSI-RS based RRM measurement may only applicable to serving cell measurement. In yet another instance, a field of N_bits can be included in a paging DCI to indicate one of the preconfigured aperiodic CSI-RS resources, wherein N_bits can be determined according to the number of preconfigured CSI-RS resources, Np, such that N_bits=ceil(log 2(Np)).

For determination of the antenna port for aperiodic CSI-RS resources, the UE assumes the antenna port for all the available CSI-RS resources are same, and the number of antenna ports is one. For determination of the BWP of aperiodic CSI-RS resources, the BWP can be same as the active DL BWP where a UE monitors paging DCI format. In another example, the aperiodic CSI-RS resources are not associated with any BWP, and the starting RB of aperiodic CSI-RS is configured relative to common resource index 0.

A configuration for Np>=1 aperiodic CSI-RS resources can be broadcasted to a UE as part of system information, e.g., in RMSI.

In one example, for each aperiodic CSI-RS resource, a UE is provided with at least one of the following configurations: a CSI-RS resource ID; aperiodic triggering offset, O_slot, in unit of one slot. O_slot indicates the delay in terms of number of slots between the slot for transmitting a paging DCI and the slot for aperiodic CSI-RS triggered by the paging DCI; CSI-RS resource mapping, which is same as CSI-RS-ResourceMapping in NR standard specification, in one example for CSI-RS resource mapping, the number of ports can be one; scrambling ID, in one example, the scrambling ID can be cell ID; and/or power control offset, in one example, the power offset between the CSI-RS and SSS in SS/PBCH block.

For another example, for each aperiodic CSI-RS resource, a UE is provided with at least one of the following configurations: a subcarrier spacing of the CSI-RS resource; a CSI-RS resource ID; a cell ID that the CSI-RS resource associated to; a measurement bandwidth including a starting RB index and number of RBs; a density of the CSI-RS resource mapping to indicate the value of p for resource mapping of CSI-RS in NR standard specification; a time-domain resource information of the CSI-RS resource including a slot offset and/or symbol index; a frequency-domain resource information of the CSI-RS resource including the RE location; an association with a SS/PBCH block and the corresponding QCL assumption; a scrambling ID; in one example, the scrambling ID can be cell ID; a first OFDM symbol index to indicate value of time domain location, $l_0$, as defined in NR standard specification; and/or a second OFDM symbol index to indicate value of time domain location, $l_1$, as defined in NR standard specification.

In one example, a UE assumes the DMRS antenna port of the PDCCH for transmitting the paging DCI format and the aperiodic CSI-RS resource triggered by the paging DCI in the PDCCH is quasi co-located with respect to Doppler spread, Doppler shift, average gain, average delay, delay spread, and, when applicable, spatial Rx parameters.

In another example, an aperiodic CSI-RS resource can be configured with an associated SS/PBCH block index, wherein the UE assumes the aperiodic CSI-RS resource and the associated SS/PBCH block is quasi co-located with respect to Doppler spread, Doppler shift, average gain, average delay, delay spread, and, when applicable, spatial Rx parameters.

Figure 15:
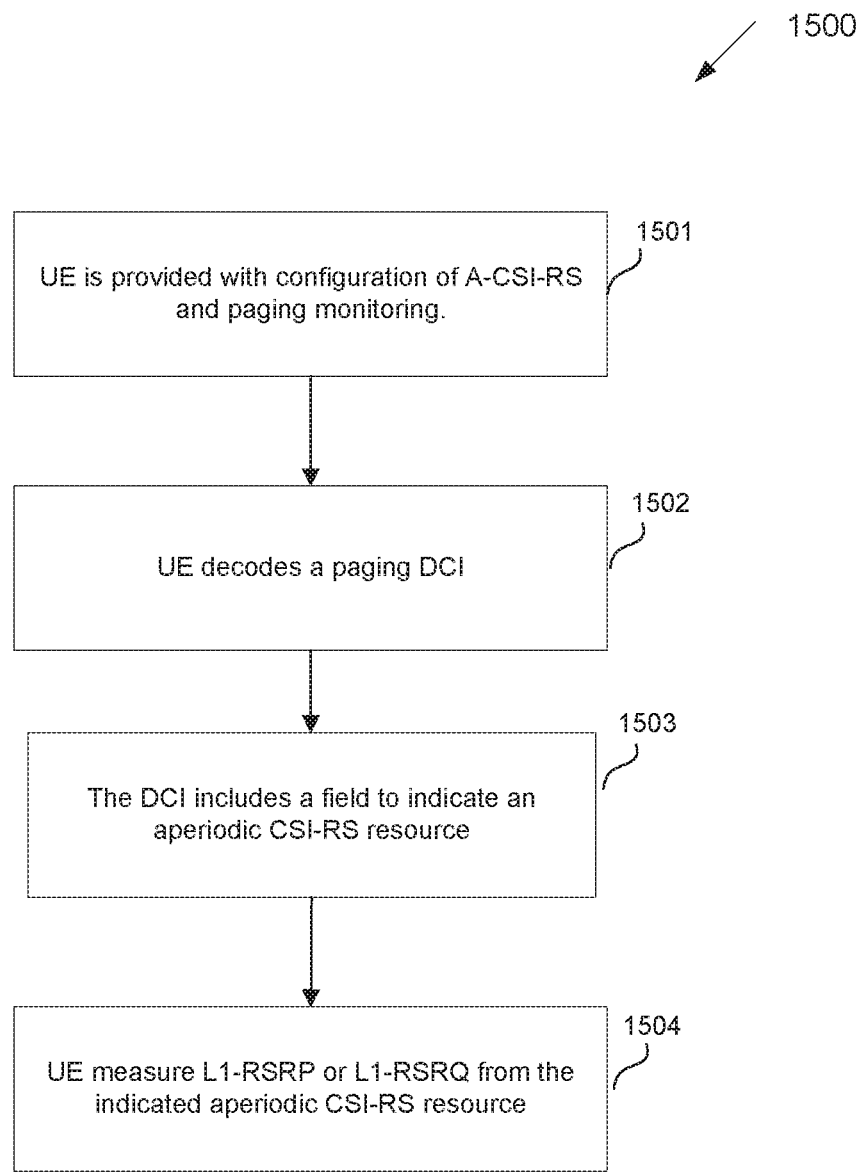
FIG. 15 illustrates a flow chart of a UE procedure for RRM measurement based on aperiodic CSI-RS measurement triggered by a paging DCI format according to embodiments of the present disclosure.

FIG. 15 illustrates a flow chart of a UE procedure 1500 for RRM measurement based on aperiodic CSI-RS measurement triggered by a paging DCI format according to embodiments of the present disclosure. An embodiment of the UE procedure 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, a UE is provided with a configuration for aperiodic CSI-RS resources applicable for RRM measurement in RRC_IDLE/INACTIVE state and paging monitoring for a serving cell through higher layer signaling, for example, in RMSI of the serving cell, in step 1501. The UE decodes a paging DCI, i.e., a DCI format with CRC scrambled by P-RNTI, successfully in step 1502. The UE interprets a DCI field for triggering aperiodic CSI-RS resource in the DCI to get the information about the aperiodic CSI-RS resource transmitted by the serving cell in step 1503. The UE measure L1-RSRP or L1-RSRQ based on the aperiodic CSI-RS resource transmitted by the serving cell in step 1504.

In one embodiment, RRM measurement based on DM-RS of PDSCH and/or PDCCH for paging message is provided.

In one example, the DMRS of PDSCH scheduled by a paging DCI, i.e., a DCI format with CRC scrambled by P-RNTI in paging search space in a serving cell, can be used for RRM measurement for the serving cell. The PDSCH is referred as paging PDSCH in this disclosure. The DMRS of paging PDSCH can be used at least for L1 RSRP measurement of the serving cell in RRC_IDLE/INACTIVE state. An energy per resource element (EPRE) power ratio between SSS in SS/PBCB block and paging PDSCH can be either defined in the specification of the system operation, for example, 3.5 dB, or provided to UEs through higher layer signaling, for example, in the RMSI of the serving cell.

Figure 16:
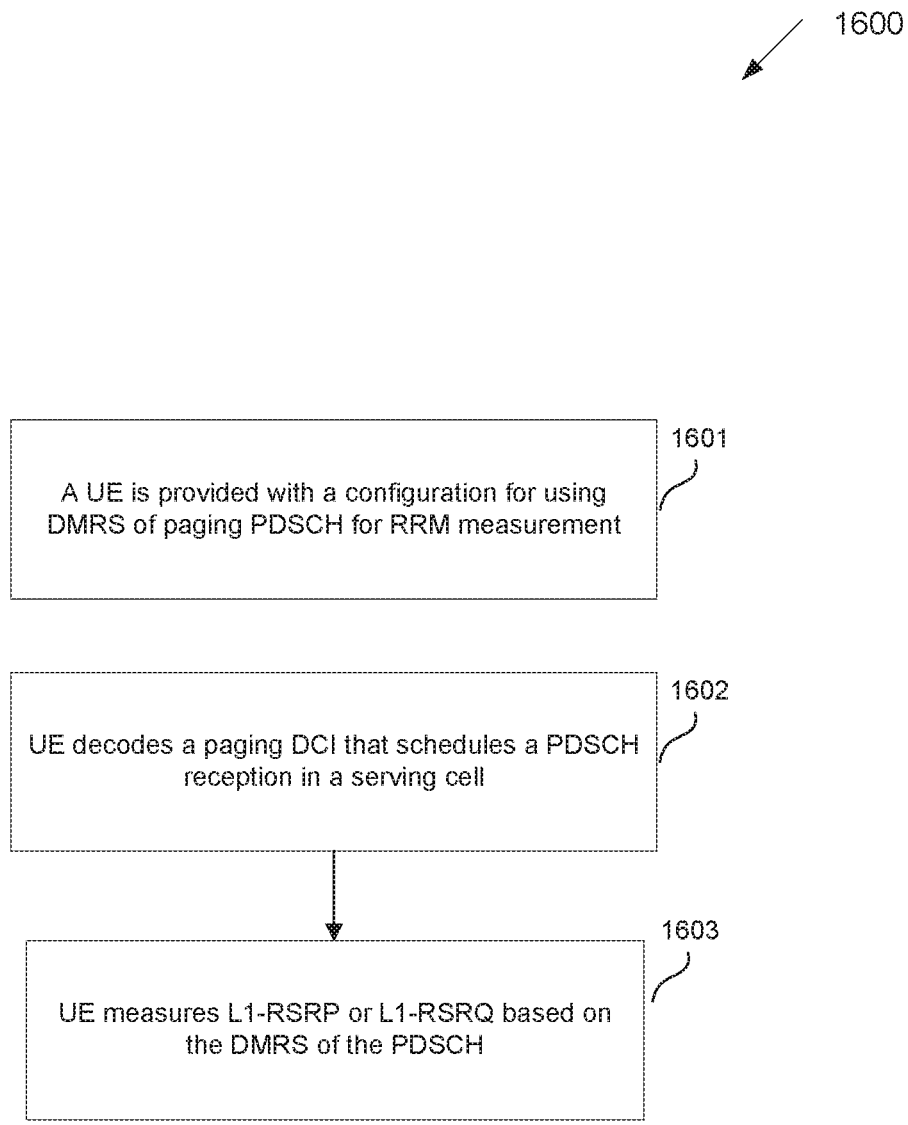
FIG. 16 illustrates a flow chart of a UE procedure for RRM measurement based on DMRS of PDSCH scheduled by a paging DCI format according to embodiments of the present disclosure.

FIG. 16 illustrates a flow chart of a UE procedure 1600 for RRM measurement based on DMRS of PDSCH scheduled by a paging DCI format according to embodiments of the present disclosure. An embodiment of the UE procedure 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, a UE is provided with a configuration through RMSI in a serving cell for using DMRS of paging PDSCH for RRM measurement in RRC_IDLE/INACTIVE state for the serving cell in step 1601. The configuration can be for example, an EPRE power ratio between SSS in SS/PBCB block and paging PDSCH. The UE decodes a paging DCI, i.e., a DCI format with CRC scrambled by P-RNTI, successfully, and the paging DCI schedules a transmission of PDSCH from the serving cell in step 1602. The UE decodes the PDSCH and measures L1-RSRP or L1-RSRQ based on the DMRS of the PDSCH in step 1603.

In one example, the DMRS of PDCCH carrying a paging DCI, i.e., a DCI format with CRC scrambled by P-RNTI in paging search space in a serving cell, can be used for RRM measurement for the serving cell. The PDCCH is referred as paging PDCCH in this disclosure. The DMRS of paging PDCCH can be used at least for L1 RSRP measurement of the serving cell in RRC_IDLE/INACTIVE state. An EPRE power ratio between SSS in SS/PBCB block and paging PDCCH can be either defined in the specification of the system operation, for example, 3.5 dB, or provided to UEs through higher layer signaling, for example, in the RMSI of the serving cell.

In one example, if the DMRS of paging PDSCH and/or PDCCH is QCLed with a SS/PBCH block, the L1 RSRP and/or L1 RSRQ can be calculated based on the REs mapped for both SSS and DMRS of the paging PDSCH and/or PDCCH.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
a transceiver; and
a processor operably coupled to the transceiver, the processor configured to:
receive, via the transceiver, a system information block (SIB) including (i) configuration information on at least one reference signal (RS) resource set and (ii) information on at least one synchronization signal block (SSB), wherein each of the at least one SSB is quasi co-located with each of the at least one RS resource set, respectively,
receive, via the transceiver, downlink control information (DCI) associated with a paging-radio network temporary identification (P-RNTI), the DCI indicating an availability for the at least one RS resource set, and
receive, via the transceiver, a RS based on at least one available RS resource set indicated by the DCI.

2. The UE of claim 1, wherein the SIB further includes information on a number of RS resources in each of the at least one RS resource set.

3. The UE of claim 2, wherein the RS resources are mapped to different orthogonal frequency division multiplexing (OFDM) symbols in a time domain and same resource blocks (RBs) in a frequency domain, and
wherein the RS resources are associated with a single antenna port.

4. A base station (BS) in a wireless communication system, the BS comprising:
a transceiver; and
a processor configured to:
transmit, via the transceiver, a system information block (SIB), including (i) configuration information on at least one reference signal (RS) resource set and (ii) information on at least one synchronization signal block (SSB), wherein each of the at least one SSB is quasi co-located with each of the at least one RS resource set, respectively,
transmit, via the transceiver, downlink control information (DCI) associated with a paging-radio network temporary identification (P-RNTI), the DCI indicating an availability for the at least one RS resource set, and
transmit, via the transceiver, a RS according to at least one available RS resource set indicated by the DCI.

5. The BS of claim 4, wherein the SIB further includes information on a number of RS resources in each of the at least one RS resource set.

6. The BS of claim 5, wherein the RS resources are mapped to different orthogonal frequency multiplexing (OFDM) symbols in a time domain and same resources blocks (RBs) in a frequency domain, and
wherein the RS resources are associated with a single antenna port.

7. A method performed by a user equipment (UE) in a wireless communication system, the method comprising:
receiving a system information block (SIB) including (i) configuration information on at least one reference signal (RS) resource set and (ii) information on at least one synchronization signal block (SSB), wherein each of the at least one SSB is quasi co-located with each of the at least one RS resource set, respectively;
receiving downlink control information (DCI) associated with a paging-radio network temporary identification (P-RNTI), the DCI indicating an availability for the at least one RS resource set; and
receiving a RS based on at least one available RS resource set indicated by the DCI.

8. The method of claim 7, wherein the SIB further includes information on a number of RS resources in each of the at least one RS resource set.

9. The method of claim 8, wherein the RS resources are mapped to different orthogonal frequency division multiplexing (OFDM) symbols in a time domain and same resource blocks (RBs) in a frequency domain, and
wherein the RS resources are associated with a single antenna port.

10. A method performed by a base station in a wireless communication system, the method comprising:
transmitting a system information block (SIB) including (i) configuration information on at least one reference signal (RS) resource set and (ii) information on at least one synchronization signal block (SSB), wherein each of the at least one SSB is quasi co-located with each of the at least one RS resource set, respectively;
transmitting downlink control information (DCI) associated with a paging-radio network temporary identification (P-RNTI) the DCI indicating an availability for the at least one RS resource set; and transmitting an RS according to at least one available RS resource set indicated by the DCI.

11. The method of claim 10, wherein the SIB further includes information on a number of RS resources in each of the at least one RS resource set.

12. The method of claim 11, wherein the RS resources are mapped to different orthogonal frequency division multiplexing (OFDM) symbols in a time domain and same resources blocks (RBs) in a frequency domain, and wherein the RS resources are associated with a single antenna port.

\* \* \* \* \*